US007921290B2

(12) United States Patent
Albert et al.

(10) Patent No.: US 7,921,290 B2
(45) Date of Patent: Apr. 5, 2011

(54) METHOD AND SYSTEM FOR SECURELY AUTHENTICATING NETWORK ACCESS CREDENTIALS FOR USERS

(75) Inventors: Roy David Albert, San Jose, CA (US); Jeff Steven Edgett, Sunnyvale, CA (US); Singam Sunder, San Jose, CA (US); James Marion Underwood, Pleasanton, CA (US)

(73) Assignee: iPass Inc.

( * ) Notice: Subject to any disclaimer, the term of this patent is extended or adjusted under 35 U.S.C. 154(b) by 940 days.

(21) Appl. No.: 10/117,868

(22) Filed: Apr. 5, 2002

(65) Prior Publication Data

US 2003/0056096 A1 Mar. 20, 2003

Related U.S. Application Data

(60) Provisional application No. 60/284,914, filed on Apr. 18, 2001.

(51) Int. Cl.
*H04L 9/00* (2006.01)

(52) U.S. Cl. .................................................. 713/168

(58) Field of Classification Search .............. 713/168, 713/150–153, 170, 182, 155, 161; 726/2–5, 726/14, 12, 8, 9; 380/28, 29, 30, 267, 255; 709/227, 230, 217–219, 223–225, 229; 705/64, 705/18; 370/230; 455/410, 411
See application file for complete search history.

(56) References Cited

U.S. PATENT DOCUMENTS

| | | | |
|---|---|---|---|
| 5,202,921 | A | 4/1993 | Herzberg et al. |
| 5,331,574 | A | 7/1994 | Temoshenko et al. |
| 5,412,723 | A | 5/1995 | Canetti et al. |
| 5,446,680 | A | 8/1995 | Sekiya et al. |

(Continued)

FOREIGN PATENT DOCUMENTS

JP 02033648 A 2/1990
(Continued)

OTHER PUBLICATIONS

International Search Report dated Sep. 16, 2002.
(Continued)

*Primary Examiner* — Beemnet W Dada
(74) *Attorney, Agent, or Firm* — DeLizio Gilliam, PLLC

(57) ABSTRACT

A method is provided to securely authenticate user credentials. The method includes encrypting a user credential with a public key at an access device wherein the public key is part of a public/private key pair suitable for use with an encryption algorithm. The encrypted network user credential is transmitted from the access device to a decryption server where it is decrypted with a private key, the private key being part of the public/private key pair suitable for use with the encryption algorithm. The decrypted user credential is then transmitted from the decryption server to an authentication server for verification. The decryption server typically forms part of a multi-party service access environment including a plurality of access providers, the method including decrypting the user credential of a user proximate an access provider associated with the user credential. The method can be used in legacy protocols such as Point-to-Point protocol (PPP), Password Authentication Protocol (PAP), Challenge-Handshake Authentication Protocol (CHAP), Remote Authentication Dial In User Service (RADIUS) protocol, Terminal Access Controller Access Control System (TACACS) protocol, Lightweight Directory Access Protocol (LDAP), NT Domain authentication protocol, Unix password authentication protocol, HyperText Transfer Protocol (HTTP), HyperText Transfer Protocol over Secure sockets layer (HTTPS), Extended Authentication Protocol (EAP), Transport Layer Security (TLS) protocol, Token Ring protocol and/or Secure Remote Password protocol (SRP).

15 Claims, 19 Drawing Sheets

U.S. PATENT DOCUMENTS

| | | |
|---|---|---|
| 5,497,421 A | 3/1996 | Kaufman et al. |
| 5,521,949 A * | 5/1996 | Huang et al. ............... 375/377 |
| 5,560,008 A | 9/1996 | Johnson et al. |
| 5,564,017 A | 10/1996 | Corn et al. |
| 5,606,663 A | 2/1997 | Kadooka |
| 5,611,048 A | 3/1997 | Jacobs et al. |
| 5,638,514 A | 6/1997 | Yoshida et al. |
| 5,726,883 A | 3/1998 | Levine et al. |
| 5,781,189 A | 7/1998 | Holleran et al. |
| 5,793,952 A | 8/1998 | Limsico |
| 5,799,084 A * | 8/1998 | Gallagher et al. ............ 380/248 |
| 5,802,592 A | 9/1998 | Chess et al. |
| 5,812,667 A | 9/1998 | Miki et al. |
| 5,815,665 A | 9/1998 | Teper et al. |
| 5,832,228 A | 11/1998 | Holden et al. |
| 5,845,267 A | 12/1998 | Ronen |
| 5,852,812 A | 12/1998 | Reeder |
| 5,892,900 A | 4/1999 | Ginter et al. |
| 5,923,756 A * | 7/1999 | Shambroom ............... 713/156 |
| 5,953,422 A * | 9/1999 | Angelo et al. ............... 713/185 |
| 5,991,292 A | 11/1999 | Focsaneanu et al. |
| 6,023,470 A | 2/2000 | Lee et al. |
| 6,023,502 A | 2/2000 | Bouanaka et al. |
| 6,026,375 A | 2/2000 | Hall et al. |
| 6,028,917 A | 2/2000 | Creamer et al. |
| 6,029,143 A | 2/2000 | Mosher et al. |
| 6,032,132 A | 2/2000 | Nelson |
| 6,032,137 A | 2/2000 | Ballard |
| 6,035,281 A | 3/2000 | Crosskey et al. |
| 6,047,051 A | 4/2000 | Ginzboorg et al. |
| 6,049,671 A | 4/2000 | Slivka et al. |
| 6,055,503 A | 4/2000 | Horstmann |
| 6,064,736 A * | 5/2000 | Davis et al. ............... 713/155 |
| 6,078,906 A | 6/2000 | Huberman |
| 6,094,721 A * | 7/2000 | Eldridge et al. ............ 713/168 |
| 6,112,239 A | 8/2000 | Kenner |
| 6,125,354 A | 9/2000 | MacFarlane et al. |
| 6,128,601 A | 10/2000 | Van Horne et al. |
| 6,141,756 A | 10/2000 | Bright et al. |
| 6,157,618 A | 12/2000 | Boss et al. |
| 6,167,126 A | 12/2000 | Janning |
| 6,175,869 B1 | 1/2001 | Ahuja et al. |
| 6,182,229 B1 * | 1/2001 | Nielsen ............... 726/8 |
| 6,188,994 B1 | 2/2001 | Egendorf |
| 6,189,096 B1 | 2/2001 | Haverty |
| 6,198,824 B1 | 3/2001 | Shambroom |
| 6,208,977 B1 | 3/2001 | Hernandez et al. |
| 6,212,280 B1 | 4/2001 | Howard, Jr. et al. |
| 6,212,561 B1 | 4/2001 | Sitaraman et al. |
| 6,216,117 B1 | 4/2001 | Hall |
| 6,219,790 B1 | 4/2001 | Lloyd et al. |
| 6,240,091 B1 | 5/2001 | Ginzboorg et al. |
| 6,253,327 B1 * | 6/2001 | Zhang et al. ............... 726/14 |
| 6,260,142 B1 | 7/2001 | Thakkar et al. |
| 6,269,401 B1 | 7/2001 | Fletcher et al. |
| 6,307,837 B1 * | 10/2001 | Ichikawa et al. ............ 370/230 |
| 6,317,792 B1 | 11/2001 | Mundy et al. |
| 6,324,579 B1 | 11/2001 | Bleuse et al. |
| 6,327,707 B1 | 12/2001 | McKeeth et al. |
| 6,330,443 B1 | 12/2001 | Kirby |
| 6,401,211 B1 * | 6/2002 | Brezak et al. ............... 726/5 |
| 6,405,028 B1 | 6/2002 | DePaola et al. |
| 6,446,207 B1 * | 9/2002 | Vanstone et al. ............ 713/180 |
| 6,463,534 B1 | 10/2002 | Geiger et al. |
| 6,510,463 B1 | 1/2003 | Farhat et al. |
| 6,522,884 B2 | 2/2003 | Tennison et al. |
| 6,539,482 B1 * | 3/2003 | Blanco et al. ............... 726/7 |
| 6,546,492 B1 | 4/2003 | Walker et al. |
| 6,549,770 B1 | 4/2003 | Marran |
| 6,577,858 B1 | 6/2003 | Gell |
| 6,578,075 B1 | 6/2003 | Nieminen et al. |
| 6,628,775 B1 | 9/2003 | Van Tol |
| 6,640,242 B1 | 10/2003 | O'Neal et al. |
| 6,687,560 B2 | 2/2004 | Kiser et al. |
| 6,725,310 B2 * | 4/2004 | Shoobe et al. ............... 710/303 |
| 6,732,270 B1 * | 5/2004 | Patzer et al. ............... 713/170 |
| 6,735,310 B1 * | 5/2004 | Hsing et al. ............... 380/28 |
| 6,748,439 B1 | 6/2004 | Monachello et al. |
| 6,753,887 B2 | 6/2004 | Carolan et al. |
| 6,785,823 B1 * | 8/2004 | Abrol et al. ............... 726/7 |
| 6,792,464 B2 | 9/2004 | Hendrick |
| 6,839,320 B2 * | 1/2005 | Paridaens et al. ............ 370/230 |
| 6,851,062 B2 | 2/2005 | Hartmann et al. |
| 6,925,182 B1 * | 8/2005 | Epstein ............... 380/277 |
| 6,947,992 B1 | 9/2005 | Shachor |
| 6,952,768 B2 | 10/2005 | Wray |
| 7,020,645 B2 | 3/2006 | Bisbee et al. |
| 7,031,705 B2 | 4/2006 | Grootwassink |
| 7,203,838 B1 * | 4/2007 | Glazer et al. ............... 713/176 |
| 2001/0021915 A1 | 9/2001 | Cohen et al. |
| 2001/0034677 A1 * | 10/2001 | Farhat et al. ............... 705/30 |
| 2001/0034693 A1 * | 10/2001 | Farhat et al. ............... 705/37 |
| 2001/0034704 A1 * | 10/2001 | Farhat et al. ............... 705/39 |
| 2001/0044893 A1 * | 11/2001 | Skemer ............... 713/153 |
| 2001/0044900 A1 * | 11/2001 | Uchida ............... 713/186 |
| 2002/0029275 A1 | 3/2002 | Selgas et al. |
| 2002/0083009 A1 | 6/2002 | Lansing et al. |
| 2002/0114346 A1 | 8/2002 | Lampe et al. |
| 2002/0144108 A1 * | 10/2002 | Benantar ............... 713/156 |
| 2003/0079143 A1 | 4/2003 | Mikel et al. |
| 2003/0131264 A1 * | 7/2003 | Huff et al. ............... 713/202 |
| 2003/0158960 A1 | 8/2003 | Engberg |
| 2003/0177389 A1 | 9/2003 | Albert et al. |
| 2003/0186681 A1 | 10/2003 | Gabor |
| 2004/0078284 A1 | 4/2004 | Musgrove et al. |
| 2004/0181602 A1 | 9/2004 | Fink |
| 2005/0021781 A1 | 1/2005 | Sunder et al. |
| 2005/0055371 A1 | 3/2005 | Sunder et al. |
| 2005/0091075 A1 | 4/2005 | Cohen et al. |
| 2005/0228874 A1 | 10/2005 | Edgett et al. |

FOREIGN PATENT DOCUMENTS

| | | |
|---|---|---|
| JP | 02039260 A | 2/1990 |
| JP | 02112053 A | 4/1990 |
| JP | 03189852 A | 8/1991 |
| JP | 04054661 A | 2/1992 |
| JP | 04067252 A | 3/1992 |
| JP | 04084254 A | 3/1992 |
| JP | 04142655 A | 5/1992 |
| JP | 05189288 A | 7/1993 |
| JP | 05199327 A | 8/1993 |
| JP | 7-49875 | 2/1995 |
| JP | 7-129605 | 5/1995 |
| JP | 07182064 | 7/1995 |
| JP | 07182064 A | 7/1995 |
| JP | 08314835 | 11/1996 |
| JP | 09265455 A | 10/1997 |
| JP | 09330298 A | 12/1997 |
| JP | 10-215284 | 8/1998 |
| JP | 10289209 A | 10/1998 |
| JP | 11-168459 | 6/1999 |
| JP | 11203247 A | 7/1999 |
| JP | 11-238075 | 8/1999 |
| JP | 11-250100 | 9/1999 |
| JP | 11-282859 | 10/1999 |
| JP | 11284666 | 10/1999 |
| JP | 11-313055 | 11/1999 |
| JP | 00112892 A | 4/2000 |
| JP | 2000101640 | 4/2000 |
| JP | 00151754 | 5/2000 |
| JP | 00165839 A | 6/2000 |
| JP | 00194657 A | 7/2000 |
| JP | 00259276 A | 9/2000 |
| JP | 01053910 A | 2/2001 |
| WO | WO 97/15885 | 5/1997 |
| WO | WO-97/15885 A1 | 5/1997 |
| WO | WO 0019297 A1 | 4/2000 |
| WO | WO-0025247 | 5/2000 |
| WO | WO-0035151 A1 | 6/2000 |
| WO | WO 0062514 A2 | 10/2000 |
| WO | WO-0103398 A2 | 1/2001 |
| WO | WO-2005104425 A2 | 11/2005 |
| WO | WO-2005104425 A3 | 11/2005 |

OTHER PUBLICATIONS

B. Aboba; "The Network Access Identifier"; Network Working Group Memo, Jan. 1999, RFC2486, The Internet Society.

"About Fiberlink", Published by Fiberlink Communications Corp.,(2001), 1 pg.

"Broadmedia Introduces G-Phone DLX Phone (Product Annoucement)", *Tele-Service News*, 12(6), (Jun. 1, 2000),2 pgs "Dial Up With Bay's New Remote Access Concentrator", *IT Times*, (Oct. 21, 1997) , p. 6.

"EarthLink Dials Up ClientLogic for Multi-Channel Technical Support", *Business Wire*, (Jul. 24, 2001), 2 pgs.

"IP Axess Adds Fixed-Wireless Service Provider to Participants in Its Expanding Evaluation Program", *Business Wire*, (Apr. 4, 2001),2 pgs.

"Lucent Technologies Launches Next-Generation Voice Dialing Service for Wireless Networks. (Brief Article).", *Cambridge Telcom Report*, (Mar. 27, 2000),2 pgs.

"Netopia Introduces First ADSL Routers to Offer Integrated Backup Module for "Fast Track" Deployment and Fully Redundant Internet Connectivity", *Business Wire*, (May 24, 2000),5 pgs.

"Trinagy's New Insight for Dial Access Solution Suite Delivers Proactive Management of Dial-Up Service Offerings", *Business Wire*, (Apr. 24, 2001),2 pgs.

"Ubrandit.com Adds Gigitel and Zodiac Cafe to Virtural ISP Client List", *Business Wire*, (Oct. 16, 2000), 2 pgs.

Edwards, Morris, "It's a VPN thing—Technology Information", *Communicating News*, (Aug. 1, 1999), 4 pgs.

Schneier, Bruce, *Applied Cryptography: protocols, algorithms, and source code in C*, New York : Wiley, 2nd Edition,(1996), 31-34, 52-56, 60, 75-79, 256, 480-481.

West, Wray, "Don't be nervous—remote access VPN's—Industry Trend or Event", *Communication News*, 37(5), (May 2000), 28, 30, 32.

Kang, Paul H., "PCT Search Report".

Barron, Gilberto , "Written Opinion", PCT/US02/12343.

Blache, Fabian III , "Spicing up the Web", *Greater Baton Rouge Business Report*, ISSN-0747-4652,(Jul. 18, 2000),v18n23 pp. 94.

Blass, Steve , "Dr. Internet", *Network World*, ISSN-0887-7661,(Mar. 11, 2002),55.

Brockmann, Peter , "Rapport dialup switch redefines Internet service opportunities", *Telesis*, ISSN-0040-2710,(96/12/00),n102 pp. 12-13.

Edwards, Morris , "It's a VPN thing. (Technology Information)", *Communications News*, ISSN-0010-3632,(Aug. 1, 1999),vol. 36, No. 8, pp. 94.

Greene, Tim , "Upstart VPN services staking out new ground", *Network World*, ISSN-0887-7661,(Apr. 16, 2001,v18n16 pp. 30.

Guy, Sandra , "Untangling phone frustration, Bellcore solution offers a simpler way to do business", *Telephony*, ISSN-0040-2656,(Jun. 2, 1997).

Harrell, Robert B., "International Search Report", PCT/US01/41540.

Johnson, Johna T., "Linking corporate users to the Internet", *Data Communications*, ISSN-0363-6399,(93/01/00),v22n1 pp. 56-58.

Likier, Marty , "Using Dial-Up Technology for Internetworking Applications", *Telecommunications*, ISSN-0278-4831,(92/05/00),v26n5 pp. 52, 54.

Malinowski, Walter , "International Search Report", PCT/US01/05752.

Millin, Vincent , "International Search Report", PCT/US01/05724.

No-Author, "Broadmedia Introduces G-Phone DLX IP Phone. (Product Announcement)", *Tele-Service News*, (Jun. 1, 2000),vol. 12, No. 6, pp. NA.

No-Author, "Companies mix and match VPN, dial-access support", *InternetWeek*, ISSN-0746-8121,(Jan. 25, 1999),n749 pVPN20.

No-Author, "Dial Up with Bay's new Remote Access Concentrator", *IT Times*, (Oct. 21, 1997)p. 6.

No-Author, "EarthLink Dials Up ClientLogic for Multi-Channel Technical Support", *Business Wire*, (Jul. 24, 2001),2226.

No-Author, "IP Axess Adds Fixed-Wireless Service Provider to Participants in Its Expanding Evaluation Program", *Business Wire*, (Apr. 4, 2001),2225.

No-Author, "Lucent Technologies Launches Next-Generation Voice Dialing Service Networks.(Brief Article)", *Cambridge Telecom Report*, (Mar. 27, 2000),NA.

No-Author, "Netopia Introduces First ADSL Routers to Offer Integrated Backup Module for "Fast Track" Deployment and Fully Redundant Internet Connectivity", *Business Wire*. (May 24, 2000),0514.

No-Author, "Trinagy's New Insight for Dial Access Solution Suite Delivers Proactive Management of Dial-up Service Offerings", *Business Wire*, (Apr. 24, 2001),2448.

No-Author, "Ubrandit.com Adds Gigitel and Zodiac Cafe to Virtual ISP Client List", *Business Wire*, (Oct. 16, 2000),0709.

Salamone, Salvatore , "Simplified Roaming, From POP to POP", *InternetWeek*, ISSN-1096-9969,(Feb. 15, 1999),n752 pp. 11.

Sanders, Bob , "Despite nasty shake-out local ISPs are thriving", *New Hampshire Business Review*, ISSN-0164-8152,(Feb. 23, 2001),v23n4 pp. 1.

Scarcia, Costantino , "Getting On the Net With The Right ISP", *New Jersey Business*, ISSN-0028-5560,(Sep. 1, 2000),v46n9 pp. 40.

Semich, J. W., "56K server supports U.S. Robotics and Lucent—Modems built into Model 8000 from Bay Networks", ISSN-1081-3071, ISSN-1081-3071,(Aug. 18, 1997),v3 n26 p. 25.

Shen, Jin , et al., "Research and implementation of proxy server", *Journal of Nanjing University of Aeronatics & Astronautics*, ISSN-1005-2615,(Dec. 2000),vol. 32 No. 6 pp. 620-624

Silberg, Lurie , "Dialing the Web AT&T's Internet Cellphone Debuts at Mass; Launches PocketNet wireless data service at retail in an attempt to bring cellphone with Internet access to the masses", *HFN the Weekly Newspaper for the Home Furnishing Network*, (Oct. 13, 1997),93.

Trammell, James , "International Search Report", PCT/US01/05723.

West, W. , "Don't be nervous Y remote access VPNs", *Communications News*, ISSN-0010-3632,(May 2000),vol. 37, No. 5 pp. 28, 30, 32.

Sato, Madoka et al.; "Automatic Generation of Electronic News Digests"; Joho Shori Gakkai Ronbunshi, Japan, Information Processing Society, Oct. 15, 1995, vol. 26, No. 10, pp. 2371-2379.

Ishida, Kazuo et al.; "Structured Text Generating System Applicable to Various Types of Documents", Joho Shori Gakkai Kenkyu Hokoku, Japan, Information Processing Society, Nov. 28, 1997, vol. 97, No. 116, pp. 31-38.

International Search Report-PCT/US02/25996-Dec. 12, 2002.

Schneier, B., Applied Cryptography Second Edition. Oct. 1995, John Wiley and Sons, pp. 31-34, 52-56, 60, 75-79, 256, 480-481.

Bruno, Lee, "Sofware & security. (Netegrity's Siteminder Enterprise Security software) (Product Information)", Data Communications, NeTegrity Inc., Jan. 1997, 84(3) pages(s), Issn-0363-6399.

Clyde, Robert A. "Try a step-by-step approach. (data security measures)", Computing Canada, Jan. 4, 1995, vol. 21, No. 1, 42(1) page(s). ISSN-0319-0161.

International Search Report-PCT/US02/12343-Sep. 19, 2002.

International Search Report-PCT/US02/12475-Sep. 11, 2002.

"U.S. Appl. No. 10/118,406, Non-Final Office Action mailed Nov. 19, 2007", OARN,13 pgs.

"U.S. Appl. No. 10/456,736,Final Office Action mailed Dec. 10, 2007", FOAR,15 pgs.

"U.S. Appl. No. 10/118,380 Non Final Office Action mailed Dec. 14, 2005", 31 pgs.

"U.S. Appl. No. 10/118,380 Response filed Mar. 13, 2006 to Non Final Office Action mailed Dec. 14, 2005", 18 pgs.

"U.S. Appl. No. 10/118,406 Final Office Action mailed Jul. 24, 2007", 13 pgs.

"U.S. Appl. No. 10/118,406 Final Office Action mailed Aug. 16, 2006", 12 pgs.

"U.S. Appl. No. 10/118,406 Non Final Office Action mailed Feb. 28, 2006", 31 pgs.

"U.S. Appl. No. 10/118,406 Non Final Office Action mailed Mar. 8, 2007", 11 pgs.

"U.S. Appl. No. 10/118,406 Response filed Jun. 5, 2006 to Non Final Office Action mailed Feb. 28, 2006", 13 pgs.

"U.S. Appl. No. 10/118,406 Response filed Jun. 15, 2007 to Non Final Office Action mailed Mar. 8, 2007", 7 pgs.

"U.S. Appl. No. 10/118,406 Response filed Dec. 8, 2006 to Final Office Action mailed Aug. 16, 2006", 13 pgs.

"U.S. Appl. No. 10/456,736 Non Final Office Action mailed Jul. 10, 2007", 23 pgs.

"U.S. Appl. No. 10/821,313, Response filed Oct. 22, 2007 to Final Office Action mailed Jun. 20, 2007", 16 pgs.
"U.S. Appl. No. 10/821,313 Final Office Action mailed Jun. 20, 2007", 17 pgs.
"U.S. Appl. No. 10/821,313 Final Office Action mailed Jun. 21, 2006", 14 pgs.
"U.S. Appl. No. 10/821,313 Non Final Office Action mailed Jan. 19, 2006", 13 pgs.
"U.S. Appl. No. 10/821,313 Non Final Office Action mailed Mar. 1, 2007", 17 pgs.
"U.S. Appl. No. 10/821,313 Response filed May 22, 2007 to Non Final Office Action mailed Mar. 1, 2007", 14 pgs.
"U.S. Appl. No. 10/821,313 Response filed Dec. 18, 2006 to Final Office Action mailed Jun. 21, 2006", 14 pgs.
"U.S. Appl. No. 10/821,313, Response filed May 18, 2006 to Non Final Office Action mailed Jan. 19, 2006", 12 pgs.
"U.S. Appl. No. 10/118,406, Response filed to Final Office Action mailed Jul. 24, 2007", 15 pgs.
"U.S. Appl. No. 10/456,736, Response filed Oct. 29, 2007 to Non-Final Office Action mailed Jul. 10, 2007", 14 pgs.
"Japanese Patent Application No. 2002-584172, Notice of the Reason For Refusal mailed Jul. 10, 2007", (with English Translation), 24 pgs.
"U.S. Appl. No. 10/118,406, Non-Final Office Action mailed Apr. 11, 2008", 10 pgs.
"U.S. Appl. No. 10/456,736, Response filed May 23, 2008 to Non Final Office Action mailed Apr. 11, 2008", 14 pgs.
"U.S. Appl. No. 10/456,736, Non-Final Office Action mailed Apr. 11, 2008", 10 Pgs.
"U.S. Appl. No. 10/456,736, Response filed Feb. 13, 2008 to Final Office Action mailed Dec. 10, 2007", 14 pgs.
"U.S. Appl. No. 10/821,313, Non-Final Office Action mailed Dec. 28, 2007", 17 pgs.
"U.S. Appl. No. 10/821,313, Final Office Action mailed on May 30, 2008", 16 pgs.
"U.S. Appl. No. 10/821,313 Response filed Apr. 29, 2008 to Non-Final Office action mailed Dec. 28, 2007", 14 pgs.
"U.S. Appl. No. 10/118,406, Response filed Feb. 22, 2008 to Non-Final Office Action mailed Nov. 19, 2007", 5 pgs.
"International Application Serial No. 2002-584172, Notice of the Reason for Refusal mailed Jul. 5, 2007", 16 pgs.
"International Application Serial No. PCT/US02/12343, International Preliminary Examination Report mailed Jul. 8, 2003", 8 pgs.
"International Application Serial No. PCT/US03/17905, International Preliminary Examination Report mailed Mar. 29, 2006", 4 pgs.
"International Application Serial No. PCT/US03/17905, Response filed Jul. 1, 2005 to Written Opinion mailed May 23, 2005", 12 pgs.
"International Application Serial No. PCT/US03/17905, Written Opinion mailed May 23, 2005", 4 pgs.
"International Application Serial No. PCT/US04/34533, International Preliminary Report on Patentability mailed Nov. 8, 2006", 6 pgs.
"International Application Serial No. PCT/US04/34533, International Search Report mailed Jan. 31, 2006", 4 pgs.
"International Application Serial No. PCT/US04/34533, Written Opinion mailed Jan. 31, 2006", 6 pgs.
"Session Identification URI", *W3C Working Draft WD-session-id-960221*, http://web.archive.org/web/19970730054113/http:/lwww.w3,orgITRIWD-session-id, (Jul. 30, 1997), pp. 1-10.
"U.S. Appl. No. 10/118,380, Notice of Allowance Received", NOAR, 15 pgs.
"U.S. Appl. No. 10/456,736, Non-Final Office Action mailed Nov. 13, 2008", 12 pgs.
"U.S. Appl. No. 10/456,736 Response filed Sep. 18, 2008 to Final Office Action mailed Jun. 19, 2008", 19 pgs.
"U.S. Appl. No. 10/118,380, Notice of Allowance mailed Jun. 12, 2008", 4 pgs.
"U.S. Appl. No. 10/118,406, Final Office Action mailed Aug. 28, 2008", 10 pgs.
"U.S. Appl. No. 10/118,406, Response filed Jul. 8, 2008 to Non Final Office Action mailed Apr. 11, 2008", 14 pgs.
"U.S. Appl. No. 10/456,736, Final Office Action mailed Jul. 18, 2008", 11 pgs.
"U.S. Appl. No. 10/456,736, Preliminary Amendment mailed Jul. 6, 2005", 9 pgs.
"U.S. Appl. No. 10/821,313, Notice of Allowance mailed Sep. 5, 2008", NOAR, 14 pgs.
"U.S. Appl. No. 10/832,424, Response filed Jul. 25, 2008 to Final Office Action mailed May 30, 2008", 15 pgs.
"Japanese Application Serial No., Office Action mailed Feb. 13, 2007", 4 pgs.
"EPO Application No. 02 764 258.6 Examination Communication dated May 20, 2009".
US 5,373,559, Kaufman, Charles W. (withdrawn).

* cited by examiner

DECRYPTION:

CHECKSUM:

METHOD AND SYSTEM FOR SECURELY AUTHENTICATING NETWORK ACCESS CREDENTIALS FOR USERS The present application claims the benefit of the filing date of U.S. provisional patent application No. 60/284,914 entitled "METHOD FOR ASSURED PASSWORD SECURITY WHEN USING INSECURE FACILITIES" filed Apr. 18, 2001.

FIELD OF THE INVENTION

The present invention relates generally to computer network security. More particularly, the present invention relates to protecting computer networks against unauthorized access and to a method and system to securely authenticate network access credentials for users.

BACKGROUND

Within the past decade, the number of users accessing computer networks such as the Internet has exploded. Typically, users access the Internet through an Internet Service Provider (ISP). A network user attempting to gain access to the Internet or a corporate local area network (LAN) must generally enter a username and password for identification verification purposes. A problem with this process is that the password is generally not secure when transmitted to the ISP using many standard authentication protocols.

FIG. 1 illustrates a diagram of a prior art ISP network configuration 100 in which network user credentials are authenticated using an insecure method. An ISP network 145 includes a network access server (NAS) 120 connected to a modem pool 115 and to the Internet 150 via a gateway 125. The ISP network 145 is also connected to an authentication server (AAA server) 135. The AAA server 135 may be local to the ISP network 145 or in a remote location a great distance from the ISP Network 145.

To establish an Internet connection, a network user typically executes a dial-up networking application on a network access device 105. The dial-up networking application prompts the network user to enter a network username and a network password and manipulates a modem 110 in order to initiate a modem session with the modem pool 115 over a public switched telephone network (PSTN) 140. After a modem session has been established, the dial-up networking application begins communicating with the NAS 120 for purposes of establishing a data connection and authenticating the network user.

One of the more common data communication protocols used to establish connections between computers is the point-to-point protocol (PPP). One particularly well-known authentication protocol, which is commonly used in conjunction with PPP, is the Password Authentication Protocol (PAP). A dial-up networking application configured to use PAP repeatedly sends the username and password pair over the established data connection until an authorization acknowledgement signals is received or the connection is terminated. The dial-up networking application is configured to control the frequency and timing of the username and password transmission.

A problem with PAP is that the password is not encrypted before it is sent over the data connection, but instead, it is sent as clear text. This means that the password is susceptible to interception by a hacker. For example, a hacker with access to the data connection can use a network monitoring application to capture and display data packets that are sent across the data connection. Such network monitoring applications are common and are often referred to as packet sniffing or packet snooping applications due to their illicit use.

Referring again to FIG. 1, once the username and password pair is received at the NAS 120, Remote Authentication Dial In User Service (RADIUS), another standard authentication protocol, is typically used to transmit the network username and password pair to an ISP authentication system 155. The RADIUS protocol provides for the symmetric encryption of the password before it is sent to the AAA server 135 in the ISP authentication system 155. The encryption method is considered symmetric because the NAS 120 and the AAA server 135 share a secret key used in the encryption algorithm. The NAS 120 uses the secret key to "lock", or encrypt, the password, while the AAA server 135 uses the secret key to "unlock", or decrypt, the password before checking the password against the password stored in an authentication database 130.

A problem with the RADIUS symmetric encryption method is that it is susceptible to a form of attack known as a "dictionary" attack. In a dictionary attack, a hacker with knowledge of the encryption algorithm intercepts an encrypted password with a packet sniffing application. Then, the hacker repeatedly tries a series of keys until one is found that yields readable characters. To make matters worse, once the secret key is compromised, a hacker can readily decrypt any password intercepted between the NAS 120 and the AAA server 135.

In response to the weaknesses inherent in the PAP/RADIUS authentication method just described, the Challenge Handshake Authentication Protocol (CHAP) was developed. In a system implemented to use CHAP, the dial-up application in the network access device 105 negotiates with the NAS 120 to use CHAP as the authentication protocol, instead of PAP. Next, the NAS 120 generates a random number and sends it to the network access device 105. The dial-up networking application executing on the network access device 105 uses the random number to generate a non-reversible hash of the password, which is then sent to the NAS 120. The NAS 120 then uses the RADIUS protocol and sends the non-reversible hash and the random number used to generate the hash to the AAA server 135. The AAA server 135 retrieves the clear text password from the authentication database 130 and repeats the hash operation using the random number received from the NAS 120. Finally, the AAA server 135 compares its generated hash value with the hash value received from the NAS 120. If the hash values are the same, the authentication is considered successful and the AAA server 135 sends the appropriate acknowledgement signal to the network access device 105.

A problem with the CHAP/RADIUS method for user authentication is that all three systems, namely the network access device 105, the NAS 120 and the AAA server 135, must be configured to use CHAP in order to take advantage of the added security. If any of the three are not configured to use CHAP, the dial-up networking application on the network access device 105 uses the PPP protocol to negotiate with the NAS 120 to use PAP as the authentication protocol.

Another disadvantage of using the CHAP/RADIUS method is that in order for CHAP to be implemented properly, the AAA server 135 must have access to clear text passwords. Many authentication systems do not store passwords in clear text form because of the added security risk that would result if the system were compromised and the passwords stolen.

More recently, authentication systems have deployed an authentication protocol referred to as Extensible Authentication Protocol (EAP). EAP works in much the same way as CHAP, except that the AAA server 135, not the NAS 120, generates the random number which the network access device 105 uses to hash the password. Consequently, EAP is subject to the same disadvantages of CHAP. Particularly, EAP is only effective if all systems in the authentication chain employ EAP.

With the advent of Broadband access, both wireless and wireline (ethernet) access providers employ web browser based authentication systems. The web browser uses Hyper Text Transport Protocol (HTTP) or Hyper Text Transport Protocol over Secure sockets layer (HTTPS) for transmitting the user credentials to the access point. A problem with HTTP is that the password is not encrypted before it is sent over the data connection, but instead, it is sent as clear text. This means that the password is susceptible to interception by a hacker. For example, a hacker with access to the data connection can use a network monitoring application to capture and display data packets that are sent across the data connection. Such network monitoring applications are common and are often referred to as packet sniffing or packet snooping applications due to their illicit use. A problem with HTTPS is that the access point needs to obtain the certificate from a well-known Certificate Authority (CA). This increases the cost of setting up the access point. The strength of the encryption used by HTTPS is regulated by government export restrictions. The web browsers include the weaker keys by default, and the users are expected to upgrade the encryption strength depending upon export restrictions. For the purposes of this specification, the term "connection application" should be construed as including, but not limited to, any device (both hardware and software) including functionality to authenticate data e.g., a peer-to-peer authentication arrangement, a dialer, a smart client, a browser, a supplicant, a smart card, a token card, a PDA connection application, a wireless connection, an embedded authentication client, an Ethernet connection, or the like.

SUMMARY OF THE INVENTION

In accordance with the invention, there is provided a method to securely authenticate user credentials, the method including:

encrypting a user credential with a public key at an access device, the public key being part of a public/private key pair suitable for use with an encryption algorithm;

transmitting the encrypted network user credential from the access device to a decryption server;

decrypting the user credential at the decryption server with a private key, the private key being part of the public/private key pair suitable for use with the encryption algorithm; and transmitting the decrypted user credential from the decryption server to an authentication server for verification.

Further in accordance with the invention, there is provided a method of authenticating user data of a user requesting access to a service access system including a plurality of service providers, the method including:

encrypting the user data with a public key, the public key being part of a public/private key pair suitable for use with an encryption algorithm; and transmitting the encrypted user data to a decryption server for decryption using the private key.

Still further in accordance with the invention, there is provided a method of authenticating user data of a user requesting access to a service access system including a plurality of service providers, the method including:

receiving encrypted user data from an access device;

decrypting the encrypted user data using a private key; and transmitting the decrypted user data to an authentication server for authentication.

The invention extends to a computer readable medium, having instructions stored thereon to execute any of the described therein methods.

In accordance with a further aspect of the invention, there is provided a computer to authenticate user data of a user requesting access to a service access system including a plurality of service providers, the computer including:

a receiver to receive encrypted user data from an access device;

decryptor to decrypt the encrypted user data using a private key; and a transmitter to transmit the decrypted user data to an authentication server for authentication.

Other features and advantages of the present invention will be apparent from the drawings and detailed description that follow.

BRIEF DESCRIPTION OF THE DRAWINGS

The present invention is illustrated by way of example, and not intended to be limited by the figures of the accompanying drawings, in which like references indicate the same or similar elements and in which.

DETAILED DESCRIPTION

Figure 1:
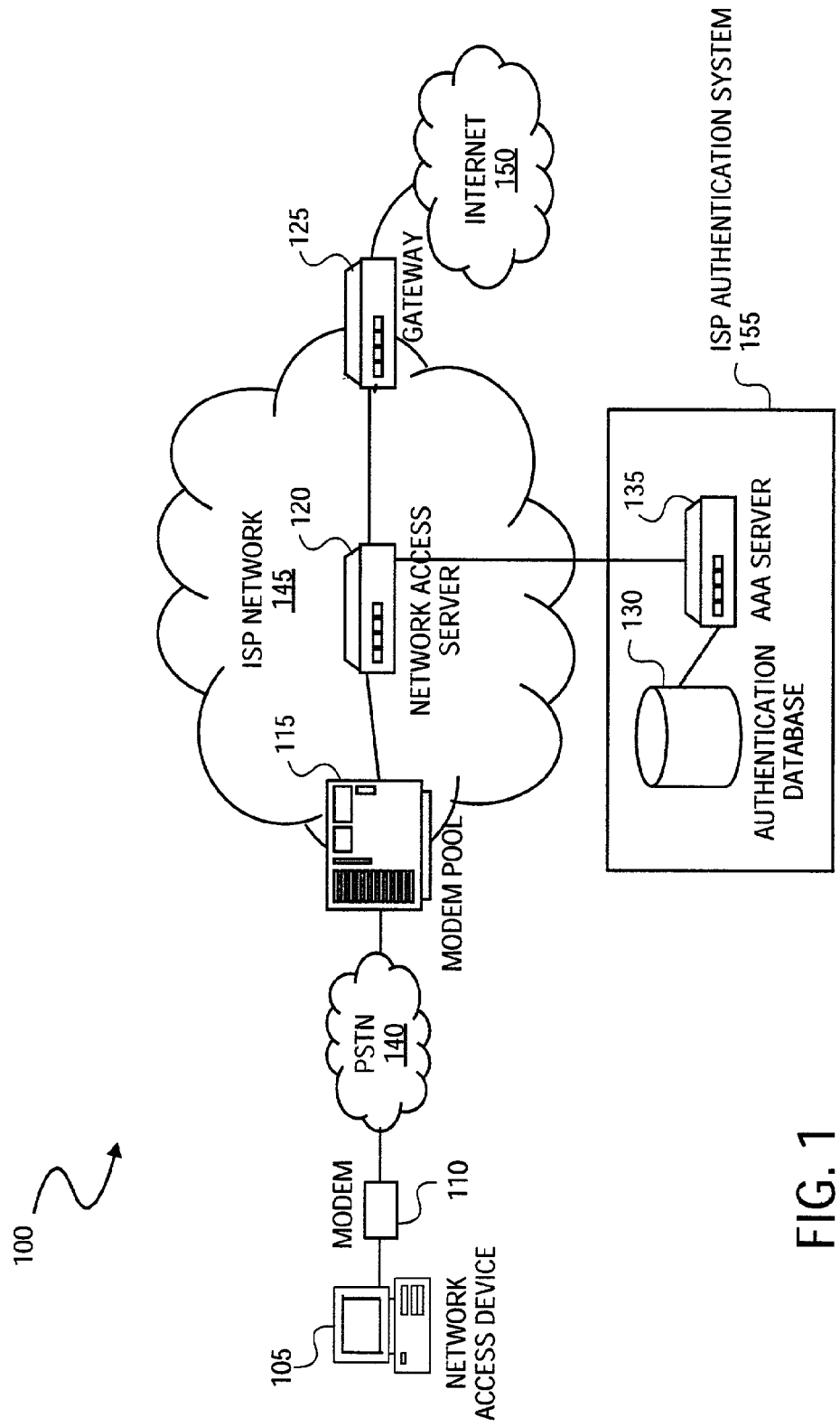
FIG. 1 is a diagram of a prior art ISP network configuration in which network user credentials are authenticated using an insecure method.

A method and system for securely authenticating network user credentials or user data are described. A network access device encrypts a network user credential, such as a password, input by a network user. The network access device encrypts the network user credential with a public key, which is part of a public/private key pair, generated with a strong encryption algorithm. The network access device transmits the encrypted network password to a network decryption server. The network decryption server decrypts the network user credential using the private key of the public/private key pair. The network decryption server transmits the decrypted password to an authentication (AAA) server for verification. If the password is positively verified at the AAA server, the AAA server sends an appropriate acknowledgment signal to the network access device indicating that the password has been properly verified or authenticated. Based on the acknowledgement signal, the network access device gains access to the Internet or some other resource.

By encrypting the network password at the network access device with an asymmetric public key based on a strong encryption algorithm, the password can be securely transmitted from the network access device to a network decryption server. If the encrypted password is captured by a sniffing or snooping application at some point between the network access device and the network decryption server, the encrypted password can only be decrypted with knowledge of the correct private key and the encryption algorithm. Preferably, decryption of the user credentials takes place as close as possible to the source which the user wishes to access.

The embodiment of the invention depicted in the drawings is independent of the underlying authentication protocols and therefore can be implemented to work with a variety of new and existing authentication protocols. Moreover, this embodiment of the invention provides for secure authentication while resolving the need to fully standardize the capability of the authentication chain. For example, by passing encrypted data through standard PPP/RADIUS information fields, the invention provides a secure authentication method without the hassle and expense of implementing and configuring network equipment to work with more complex authentication protocols, such as CHAP and EAP. It is, however, to be appreciated that the invention may be used with CHAP, EAP and other protocols and is not limited to application in a PAP/RADIUS environment.

Figure 2:
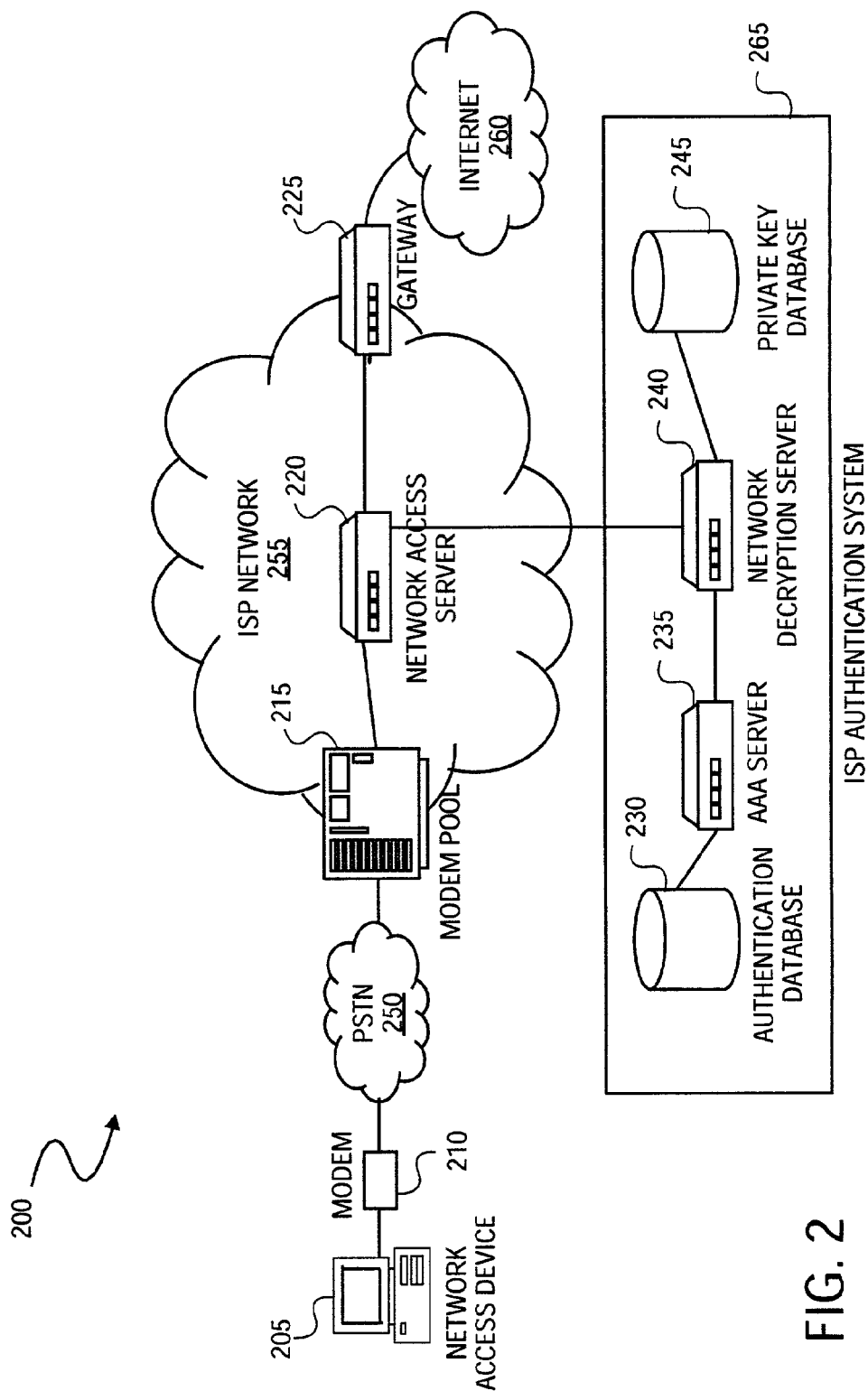
FIG. 2 is a diagram of a network configuration including an ISP network, a network access device, and a network decryption server, consistent with an embodiment of the invention.

FIG. 2 is a diagram of a network configuration 200 including an ISP network 255, a network access device 205 and a network decryption server 240, consistent with one embodiment of the invention. The ISP network 255 includes a NAS 220, a modem pool 215 and a gateway 225. The ISP network 255 is connected to the Internet via the gateway 225 and connected to an ISP authentication system 265 via a connection between the NAS 220 and a network decryption server 240. In one embodiment, the ISP network 255 and the ISP authentication system 265 are physically located within the same facility. However, in an alternative embodiment, the ISP authentication system 265 is located in one facility and connected via a wide area network (WAN) to one or more ISP networks, such as the ISP network 255. This type of configuration allows for the individual ISP networks to be strategically located in different geographical areas thereby allowing customers to access the network via a local telephone call, while centralizing the authentication system for added security.

In one embodiment of the invention, to access the Internet 260, a network user executes a dial-up connection application on the network access device 205. In alternative embodiments, other types of network connection applications may be utilized to access the Internet. The dial-up connection application prompts the network user to input a network username and a network password and manipulate a modem 210, causing it to establish an audio communication session with the modem pool 215. Although the modem 210 is shown in FIG. 2 as an external device, in alternative embodiments of the invention, the modem 210 may be an internal device integrated with the network access device 205. Once an audio communication session has been established, the NAS 220 begins communicating with the network access device 205 for the purpose of authenticating the network user.

Before the network access device 205 sends the network credentials entered by the network user, the network password is encrypted. The password is encrypted using the public key of a public/private key pair. This encryption technique is well known in the art and is generally referred to as asymmetric public key cryptography. In asymmetric public key cryptography, a person makes one key publicly available and holds a second, private key. A message is "locked", or encrypted, with the public key, sent, and then "unlocked", or decrypted, with the private key.

In the embodiment of the invention depicted in the drawings, a strong encryption algorithm is used to generate the public/private key pair. The public key and private key have a mathematical relationship based on an elliptic curve. This encryption technique is well known in the art and is generally referred to as elliptic curve cryptography or ECC. Public key encryption algorithms rely on a one-way mathematical problem, which makes it easy to generate a public key from a private key but difficult to deduce the private key, given the public key. Elliptic curve systems use an algebraic formula to determine the relationship between public and private keys within the universe created by an elliptic curve. Elliptic curve cryptography is advantageous because the key sizes are small relative to other strong encryption techniques. This allows a password to be encrypted with strong encryption and yet, an encrypted password still fits in the password data field defined by the popular authentication protocols, such as PAP, CHAP, EAP, and RADIUS.

Referring again to FIG. 2, the public key is known to the network access device 205, while the private key is stored in a private key database 245. The network access device 205 encrypts the password using the public key before sending the network username and the encrypted network password to the NAS 220. The NAS 220 forwards the network username and the encrypted network password to the network decryption server 240. The network decryption server 240 uses the network username as an index into the private key database 245 and retrieves the private key associated with the network username. Then, the network decryption server 240 uses the private key to decrypt the encrypted network password and to generate the original clear text password as input by the network user.

Finally, the network decryption server 240 forwards the network username and the clear text network password to the AAA server 235 for verification. The AAA server 235 uses the network username as an index into the authentication database 230 to retrieve the official password that is associated with the network username. If the official password matches the password input by the network user and sent by the network access device 205, the AAA server 235 sends an appropriate acknowledgment signal to the NAS 220, and the NAS 220 forwards the signal to the network access device 205, acknowledging the successful verification and granting access to the Internet or some other resource.

One embodiment of the invention is independent of the authentication protocols used to send the credentials from the network access device 205 to the NAS 220 and ultimately to the AAA server 235. For example, the invention can be implemented to work with popular authentication protocols such as PAP, CHAP, EAP and RADIUS, among others.

For one embodiment of the invention, the NAS 220 is configured to use PAP and RADIUS for authenticating network user credentials. When configured for PAP/RADIUS, the NAS 220 negotiates the use of PAP with the network access device 205 when the communication session between the NAS 220 and the network access device 205 is initiated. The NAS 220 is configured as a RADIUS client of the AAA server 235, which is a RADIUS server. The network decryption server 240 is also configured as a RADIUS server, but acts as a RADIUS proxy client to the AAA server 235. In this configuration, the network access device 205 encrypts the password, as entered by the network user. Then, the network access device 205 creates a PAP packet and places the network username and encrypted network password into the proper fields within the packet. Next, the network access device 205 sends the PAP packet to the NAS 220. The NAS 220 forwards the data to the network decryption server 240 using a RADIUS packet. The network decryption server 240 decrypts the password and uses RADIUS to forward the clear text password to the AAA server 235 for verification.

In an alternative embodiment, the NAS 220 is configured to use CHAP and RADIUS to authenticate network user credentials. In a network configured to use CHAP/RADIUS, the NAS 220 negotiates with the network access device 205 to use CHAP as the authentication protocol, instead of PAP. Next, the NAS 220 generates a random number and sends it to the network access device 205. The dial-up connection application executing on the network access device 205 uses the random number to generate a non-reversible hash of the password using a pre-determined encryption algorithm. Rather than encrypt the actual password, the network access device 205 encrypts the non-reversible hash of the network password in accordance with the exemplary embodiment of the invention as described above. The network access device 205 creates a CHAP packet and sends the network username and the encrypted non-reversible hash to the NAS 220.

The NAS 220 sends the data, including the network username, the encrypted non-reversible hash, and the original random number used to generate the non-reversible hash, to the network decryption server 240 using the RADIUS protocol. The network decryption server 240 decrypts the non-reversible hash and replaces the non-reversible hash in the RADIUS packet, which is forwarded to the AAA server 235.

The AAA server 235 receives the packet and retrieves the password associated with the network username from the authentication database 230. The AAA server 235 uses the random number originally generated at the NAS 220 to perform a hash operation on the original password retrieved from the authentication database 230. Next, the AAA server 235 compares the hash it generated to the hash it received from the network access device 205. If the two hashes match, the verification is successful and the AAA server 235 sends an appropriate acknowledgment signal to the network access device 205 granting access to the Internet 260 or some other resource.

In another embodiment of the invention, the NAS 220 is configured to use EAP and RADIUS. EAP works in much the same way as CHAP, except the random number sent to the network access device 205 is generated by the AAA server 235 instead of the NAS 220. Because the invention works with any authentication protocol, the invention can easily be implemented to work with a variety of network configurations and provides a very strong, minimal level of security using LEGACY systems.

Figure 3:
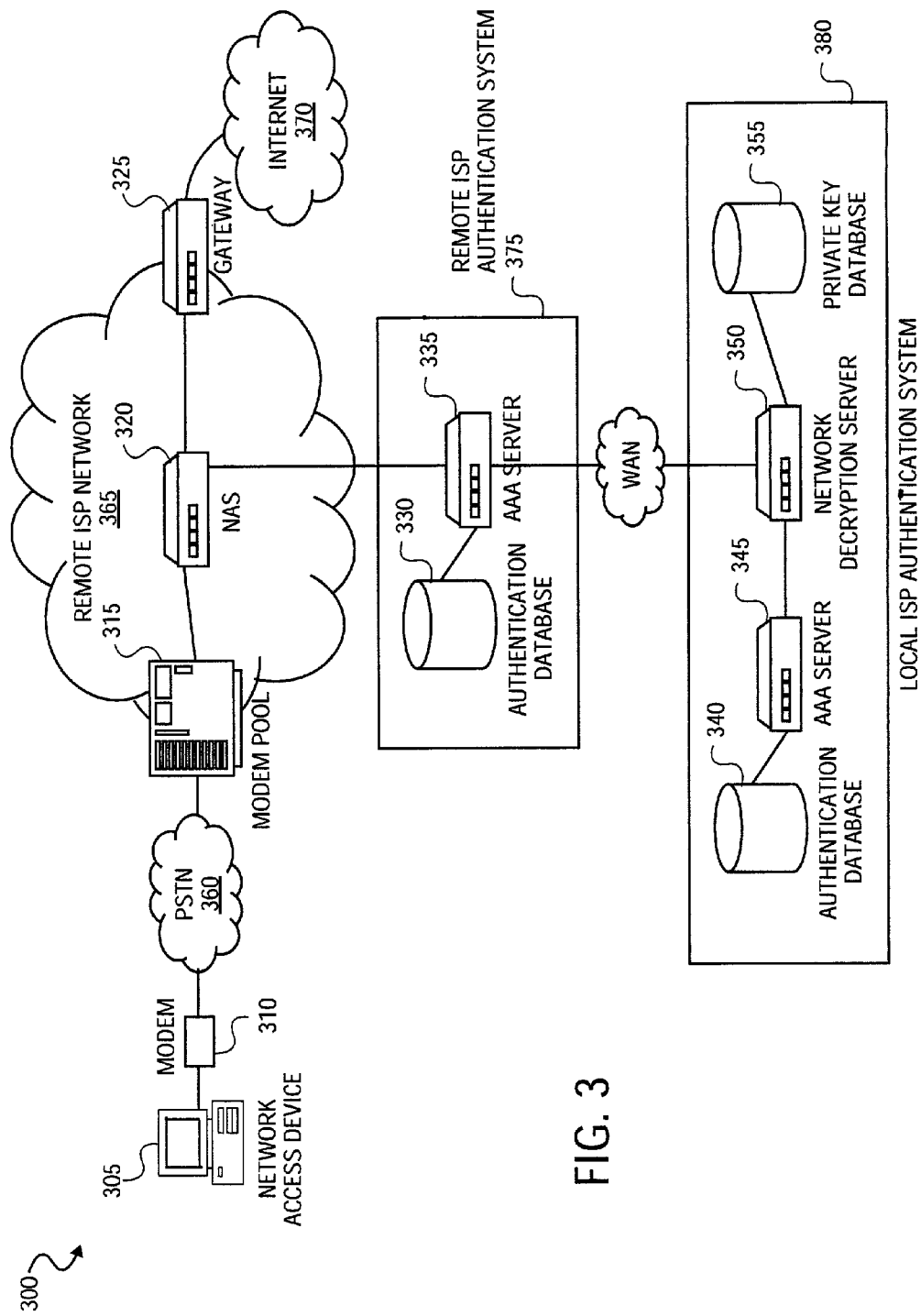
FIG. 3 is a diagram of a network configuration including a remote ISP network, a network access device and a network decryption server, consistent with an embodiment of the invention.

FIG. 3 is a diagram of a network configuration 300 including a remote ISP network 365, a network access device 305 and a network decryption server 350, consistent with one embodiment of the invention. The remote ISP network 365 includes a NAS 320, a modem pool 315 and a gateway 325. The remote ISP network 365 is connected to the Internet 370 via the gateway 325 and connected to a remote ISP authentication system 375 via a connection between the NAS 320 and the AAA server 335. The remote ISP authentication system 375 is connected to a local ISP authentication system 380 via a WAN connection between the AAA server 335 and the network decryption server 350.

The configuration 300 allows a network user via the network access device 305 to accesses the Internet 370 through the remote ISP network 365. A local ISP, which operates and maintains the local ISP authentication system 380, makes arrangements with a remote ISP, such that network users of the local ISP are allowed access to the Internet via the remote ISP network 365, which is maintained and operated by the remote ISP. This type of business arrangement might exist where the remote ISP is located in a distant geographical area or different country from the local ISP. The embodiment of the invention depicted in FIG. 3 is particularly advantageous in this type of configuration because of the inability of the local ISP operators to control who has access to the equipment that comprises the remote ISP network 365 and the remote ISP authentication system 375. Further, the remote ISP network 365 only has access to an encrypted version of the password thereby enhancing security.

The embodiment of the invention illustrated in FIG. 3 works in much the same way as discussed above in relation to FIG. 2, except that the encrypted password passes through the remote ISP network 365 and the remote ISP authentication system 375. Referring to FIG. 3, to access the Internet 370, a network user executes a dial-up connection application on the network access device 305. The dial-up connection application prompts the network user to input a network username and network password and manipulates the modem 310, causing it to establish an audio communication session with the modem pool 315. Once an audio communication session has been established, the NAS 320 begins communicating with network access device 305 for the purpose of authenticating the network user.

Before transmitting the network password to the NAS 320, the network access device 305 encrypts the network password with a public key as discussed above. The network access device 305 then creates a data packet destined for the local ISP authentication system 380 and forwards the packet to the NAS 320 of the remote ISP 365. The NAS 320 receives the data packet containing the encrypted password and forwards it to the remote ISP authentication system 375 and the AAA server 335 in particular. The AAA server 335 examines the data packet, discovers it is destined for the local ISP authentication system 380, and forwards the data packet to the network decryption server 350.

The network decryption server 350 receives the data packet and retrieves the private key associated with the network username from a private key database 355. Then, the network decryption server 350 decrypts the encrypted password and forwards the data packet with the clear text password to the AAA server 345 for verification. The AAA server 345 uses the network username as an index into the authentication database 340 to retrieve the clear text password associated with the username from the authentication database 340. If the retrieved password matches the password received from the network access device 305, then the AAA server 345 sends an appropriate acknowledgment signal to the AAA server 335 of the remote ISP 365. The AAA server 335 forwards the signal to the NAS 320. The NAS 320 forwards the signal to the network access device 305 acknowledging the successful verification and granting access to the Internet or some other resource. Thus, decryption takes place in proximity to a local ISP associated with the user and any one or more intermediary ISPs only have access to encrypted authentication data.

Figure 4:
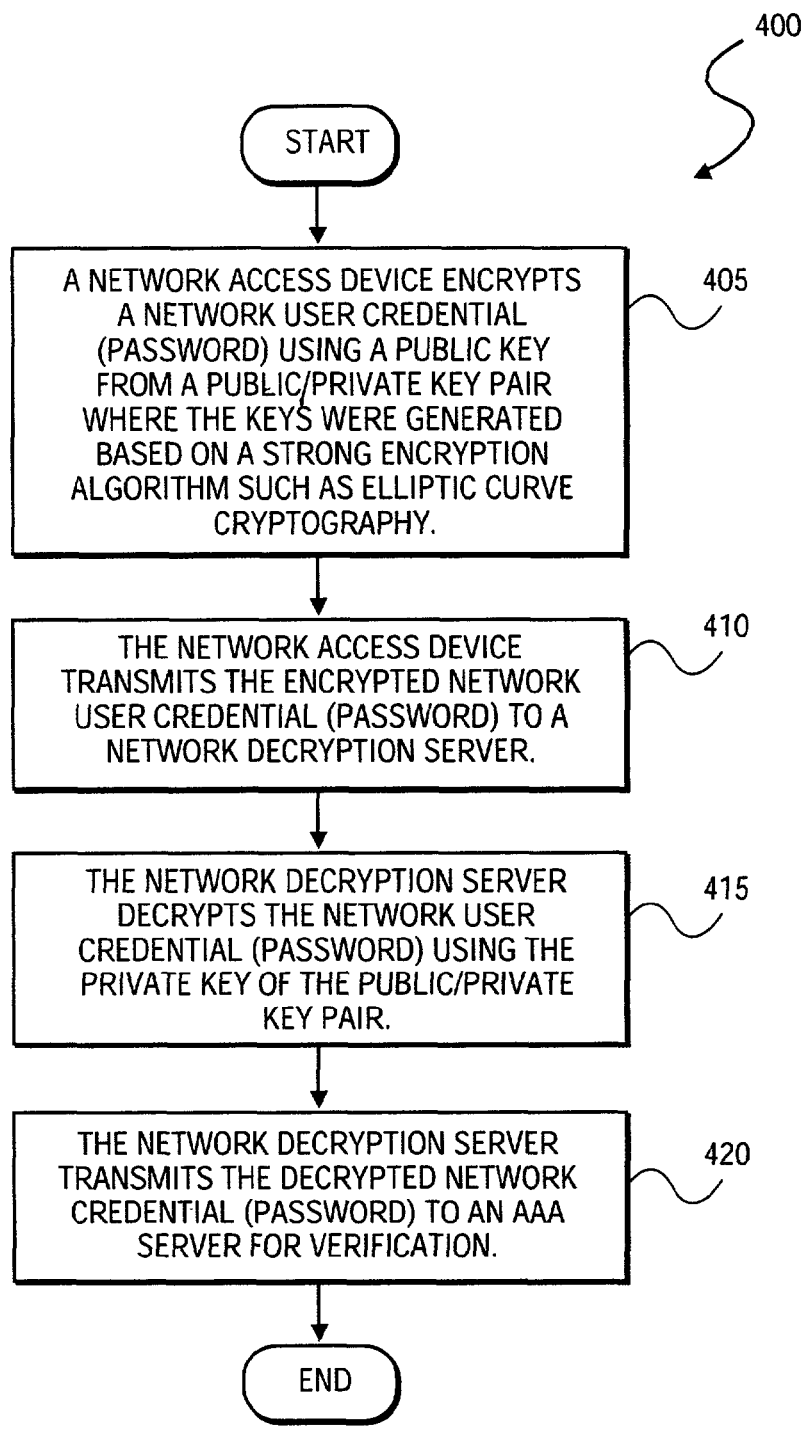
FIG. 4 is an exemplary flow diagram of the operations for a method to securely authenticate network user credentials.

FIG. 4 illustrates a flow diagram of the operations 400 for a method to securely authenticate network user credentials, consistent with one embodiment of the invention. The method begins at operation 405. At operation 405, a network access device uses a public key, which is part of a public/private key pair, to encrypt a network credential such as a password. The public/private key pair has been previously generated based on a strong encryption algorithm, such as elliptic curve cryptography.

At operation 410, the network access device transmits the encrypted network credential to a network decryption server. The encrypted password may be forwarded through several network nodes, including network access servers and AAA servers before it ultimately reaches the network decryption server.

At operation 415, the network decryption server decrypts the encrypted network credential using the private key of the public/private key pair referred to above. The network decryption server may retrieve the private key from a private key database, using the username as an index into the private key database.

Finally, at operation 420, the network decryption server transmits the decrypted network credential to an AAA server for verification. The decrypted network credential may be forwarded over several network nodes, such as network access servers or other AAA servers before ultimately reaching the AAA server for verification.

A typical application of the invention is in a multi-party service access environment and its application therein is described below. Such applications typically include roaming users, multiple service providers and multiple customers. Further, such applications typically use PAP, CHAP, EAP, RADIUS or the like protocols which communicate user credentials in an insecure fashion. However, the embodiment described below allows secure authentication in LEGACY systems.

Terminology

For the purposes of the present specification, the term "service access transaction" includes any transaction between a service customer and a service provider for a user session. An example of such a service may be access to any communications network via any medium or protocol. For example, the communications networks may comprise packet-switched networks, circuit-switched networks, cable networks, satellite networks, terrestrial networks, wired networks, or wireless networks. The term "service access transaction", however, is not limited to a network access transaction, and encompasses a transaction pertaining to access to any one of a number of other services such as content, commerce and communications services.

For the purposes of the present specification, the term "customer" includes any entity involved in the purchase and/or consumption of service access, regardless of whether the service access is performed by the customer or not. For example, a "customer" may be an end-user consumer that actually utilizes the service access, or a corporate entity to which such an end-user belongs, an Internet service provider, an Internet carrier, a reseller, or a channel.

Multi-party Services Access Environment

This embodiment of the present invention discloses a multi-party access broker and settlement system for service access (e.g., Internet access, content access, commerce access, or communications access) services that enable a service provider (e.g., an ISP, a wireless service provider, a VPN service provider, a content distribution service provider, an e-commerce service provider or an application service provider) to offer relatively secure service access in a multi-party access environment using standard communication protocols (e.g., PPP, HTTP) and standard authentication protocols (e.g., RADIUS, PAP, EAP or the like). Such protocols typically define a user field of a maximum length and the exemplary embodiment of the invention describes, inter alia, a method and system to provide secure authentication within a field with the abovementioned maximum length. Accordingly, the invention may be applied to LEGACY systems.

Overview

Figure 5:
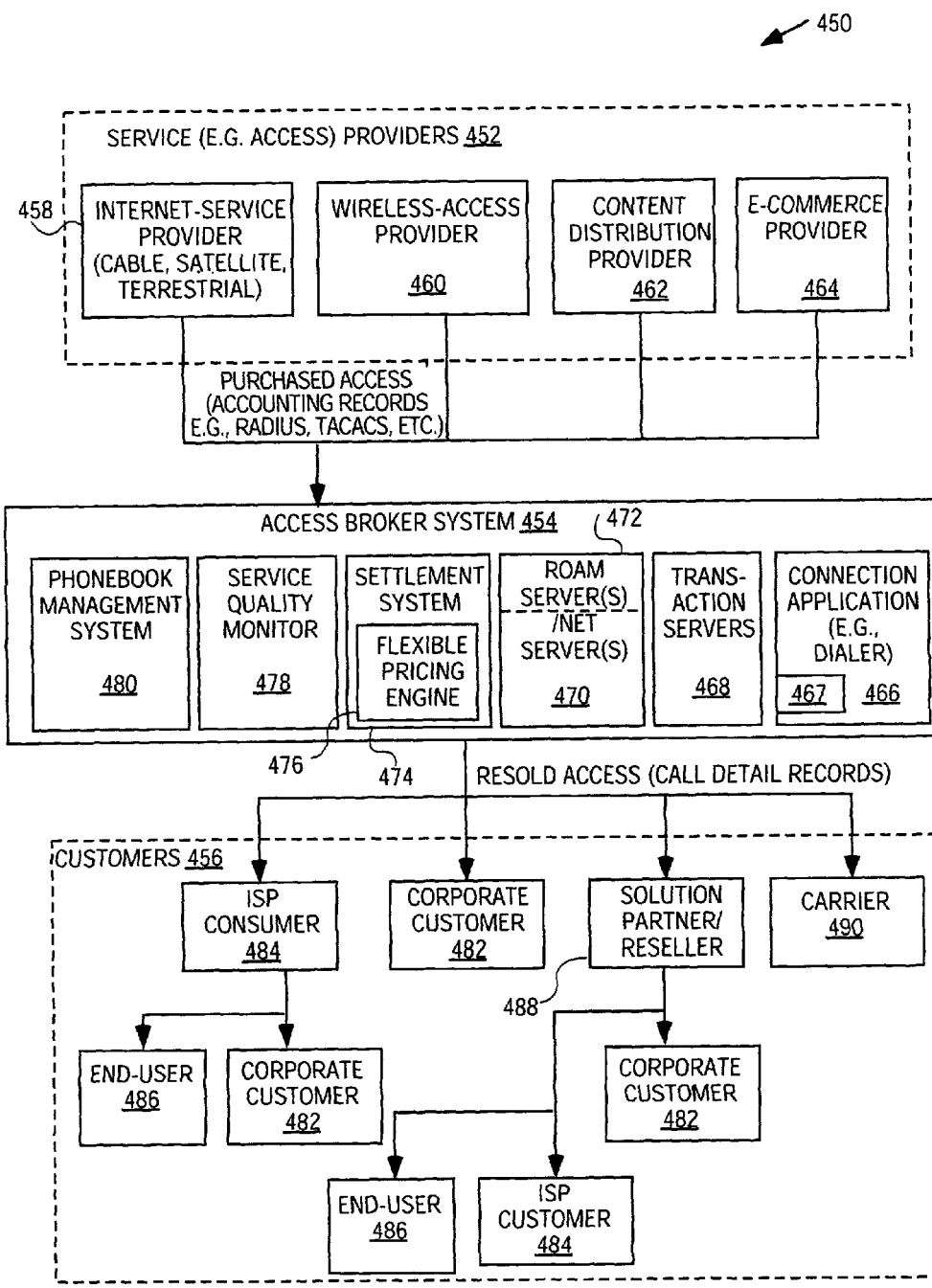
FIG. 5 is a block diagram of a multi-party service access environment, in accordance with an exemplary embodiment of the invention, which includes a number of service providers, an access broker system and multiple customers.

FIG. 5 is a block diagram of an exemplary multi-party service access environment 450, in the exemplary form of a network access environment, which includes a number of service providers 452, an access broker system 454, and multiple customers (or consumers) 456. At a high level, the service providers 452 have service (e.g., access, content, e-commerce services etc.) capacity that is sold, via the access broker system 454, to the multiple customers 456. Accordingly, the access broker system 454 may be regarded as purchasing service capacity (e.g., service access), which is then resold to the customers 456. While the service to which access is provided below is network access, it will be appreciated that access is described below as an exemplary service and, for the purposes of this specification should be taken to include any form of access as described above. In the exemplary embodiment, the service providers 452 may include any communication network service providers, such as ISPs 458 (e.g., UUNet Technologies, Genuity, CompuServe Network Services, EQUANT, Hong Kong Telecom, etc.), wireless access providers 460 (e.g., Verizon, Sprint, Pacific Bell), content distribution providers 462 and e-commerce providers 464. The service providers 452 may, however, include any number or type of service providers providing any number of services (e.g., access, content, communications or e-commerce services, to name but a few).

The exemplary access broker system 454 includes a number of components. A connection application is a client application typically in the form of a dial-up application or connect dialer 466, installed on a service or network access device (e.g., a computer system such as the access devices 205, 305 in FIGS. 2 and 3) of a customer 456 that facilitates convenient access to a communications network. In one embodiment, the connect dialer 466 may provide a simple point-and-click interface for dialing into a worldwide connection network of the access broker system 454. To this end, the connect dialer 466 may store multiple phone numbers for multiple ISPs worldwide with potentially different setup and dial-up scripting information. As described above broadly with respect FIGS. 1 to 4, the connect dialer 466 encrypts user data and counter data in such a fashion so that it may be included in the user string permitted or allowed by known protocols such as Point-to-Point protocol (PPP), Password Authentication Protocol (PAP), Challenge-Handshake Authentication Protocol (CHAP), Remote Authentication Dial In User Service (RADIUS) protocol, Terminal Access Controller Access Control System (TACACS) protocol, Lightweight Directory Access Protocol (LDAP), NT Domain authentication protocol, Unix password authentication protocol, HyperText Transfer Protocol (HTTP), HyperText Transfer Protocol over Secure sockets layer (HTTPS), Extended Authentication Protocol (EAP), Transport Layer Security (TLS) protocol, Token Ring protocol and/or Secure Remote Password protocol (SRP).

The environment 450 also includes a plurality of transaction servers 468 that provide trusted third-party functionality of routing and logging user identification information, authorization responses and usage, and accounting information. The transaction servers 468 include decryption functionality and may thus define decryption servers.

Whereas the connect dialer 466 is installed on a client or user network access device 205, 305, the netservers 470 are installed at a "remote" ISP allowing its POPs to be utilized by roaming users, and roam servers 472 reside at a "home" ISP to allow a roam user access an associated home network. It should be noted that the transaction servers 468 operate to route messages between the network and roam servers 470 and 472.

A settlement system 474, including a flexible pricing engine 476, performs financial settlement of service access transactions between the service providers 452 and the customers 456. The access broker system 454 is also includes a Service Quality Monitor 478 (SQM) that facilitates the collection and analysis of quality of service (QoS) information for services provided to customers 456 and a phonebook management system 480 that facilitates management of multiple connect dialers 466 used by customers 456. The transaction servers 468 are accessed by the settlement system 474 to load transaction data. The various components in the environment 450 may include aspects of known functionality and, dependent upon the specific embodiment of the invention, certain components may be omitted.

The Customers

The customers 456, in the embodiment depicted in the drawings, are arranged in a multi-tier customer structure, whereby the access broker system 454 may interact with customers 456 that operate according to a variety of business plans and needs. At one end of the spectrum, the customer 456 may comprise an individual end-user that subscribes to a roaming system facilitated via the access broker system 454. Alternatively, the customer 456 may be in the form of a corporate customer 482 (e.g., a corporation or business) that purchases roaming Internet access for employees of the corporation.

Each customer 456 may also comprise an ISP customer 484 that purchases roaming Internet access for resale to its customers (e.g., end-users 486 and corporate customers 482). Each customer 456 may also operate as a solution partner or reseller 488 that markets and resells roaming Internet access brokered by the access broker system 454 to end-users 486, corporate customers 482 and/or ISP customers 484.

The customers 456 may also include parties regarded as Internet Carriers 490 (e.g., IXCs, RBOs, CLECs, ILECs and ISPs). It will thus be appreciated that in the multi-party access environment 450 a number of different service providers may participate in providing access to a roaming user and, accordingly, customer security issues and, in particular, secure authentication of users, are of importance. Also, as the number of participants increases, accounting issues tend to become more complex.

Roaming Service Access

Figure 6:
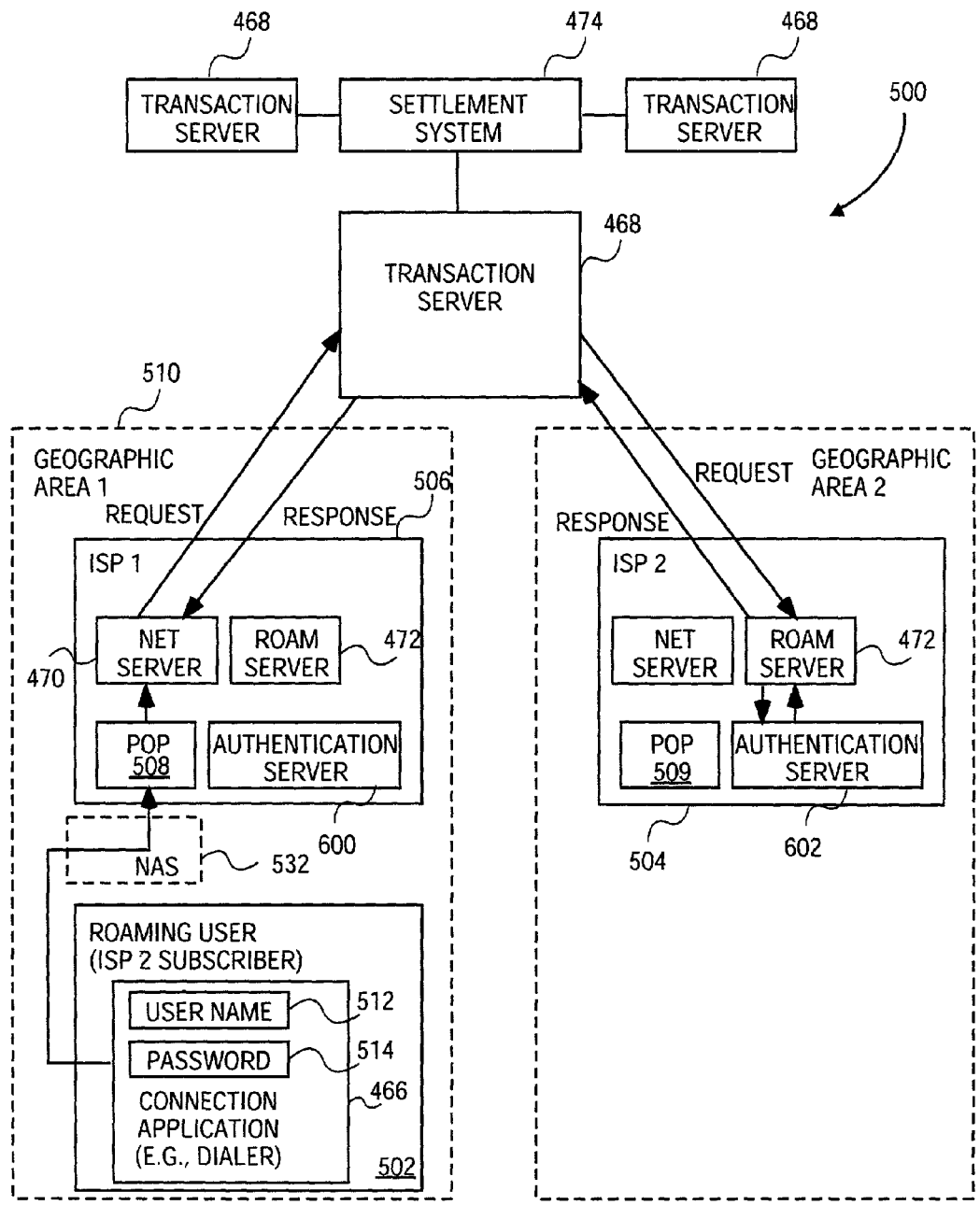
FIG. 6 is a schematic diagram illustrating operation of an access broker system, in accordance with an exemplary embodiment of the invention, to provide roaming Internet access.
Figure 7:
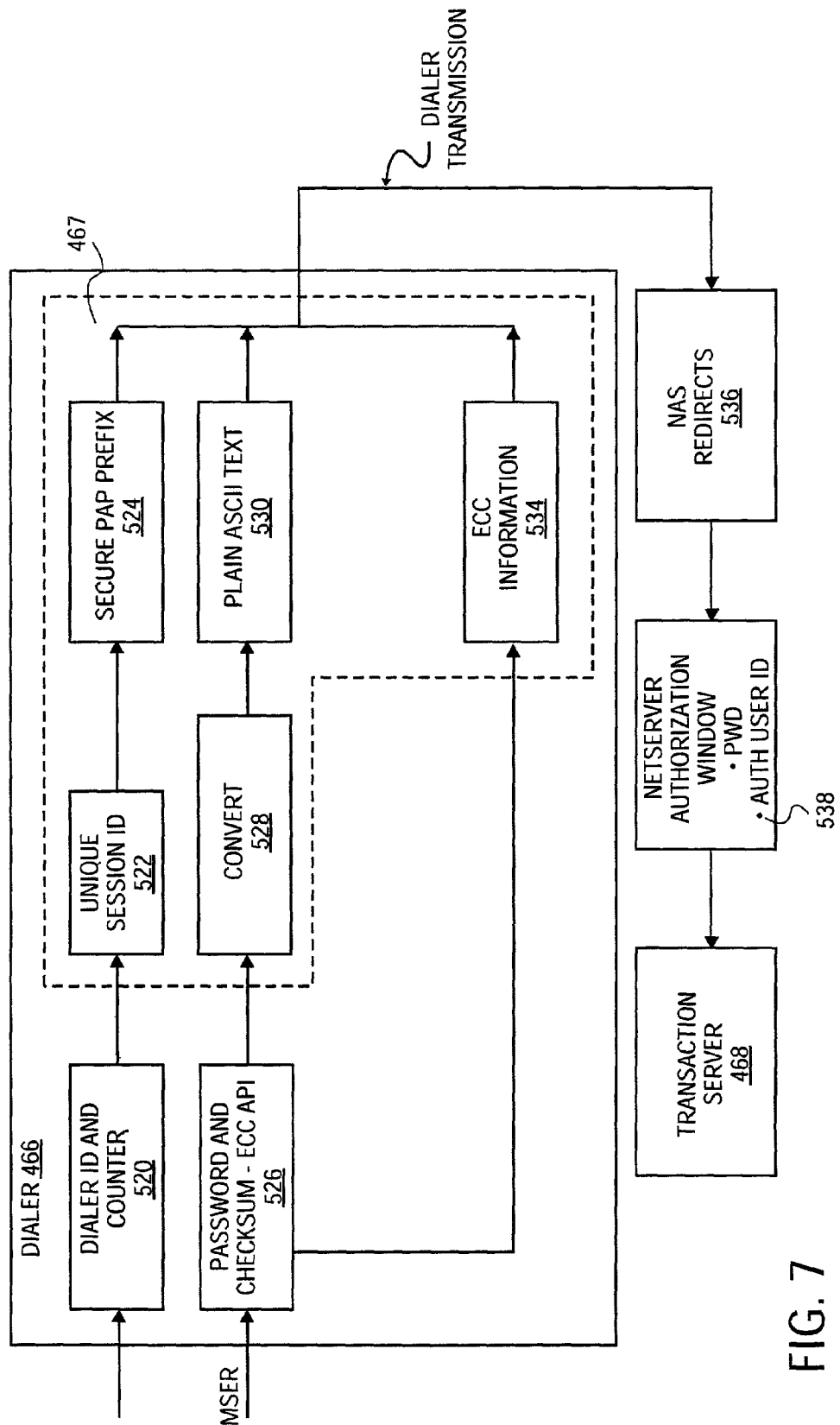
FIG. 7 is a schematic functional block diagram of a connect dialer in accordance with a exemplary embodiment of the invention.

Referring in particular to FIG. 6, reference numeral 500 generally indicates an example of how the access broker system 454 may provide roaming Internet access in a relatively secure manner in accordance with an embodiment of the invention. When a roaming user 502, shown to be a subscriber to a "home" ISP 504, connects to a remote ISP 506 that provides a local POP 508 within a specific geographic area 510, the roaming user 502 inputs the same user name 512 and password 514 (i.e., authentication data or user credentials) used when connecting via a POP 509 of the "home" ISP 504. However, standard or LEGACY multi-party access environments typically use PAP for dialup authentication and HTTP POST based authentication for wired and wireless broadband authentication. This results in the passwords being transported via insecure media and their confidentiality may be compromised and subsequently used to fraudulently access both networks of the access broker system 454 and the customers 456. In order to alleviate this problem, in accordance with one embodiment of the invention, user data is encrypted by the connect dialer 466 prior to communicating it to the POP 508, as described above with reference to FIGS. 1 to 4, and in the context of a multi-party environment with reference to FIGS. 5 to 13.

In the embodiment depicted in the drawings, the customers 456 use a web form for requesting the connect dialer 466. This web form may include fields that can be used for specifying the required customizations. For example, the following fields are included in the web form for Secured Password Authentication in Plain-text (hereinafter referred to as "Secure PAP")

Enable Secure PAP encryption: (Y/N)
Public Key: ****
Key Id: (0-9)

When a customer 456 wants to enable Secure PAP for their roaming users 502 (see FIG. 6), they use an ECC utility that is included in their associated roam server 472. The roam server 472 runs an application supplied by the access broker system 454 to the customers 456 and generates a public/private key pair. The private key is typically added to an esp_key_pair.txt file. The public key is typically sent to the dialer support team of the access broker system 454 using an appropriate form. The dialer support team uses a dialer customization tool (DCT) to build the connect dialer 466 in accordance with one embodiment of the invention. The DCT tool includes a web page for specifying the encryption/decryption algorithm to be used and the ECC public/private keys.

The connect dialer 466 maintains a dialer id and counter (see block 520 in FIG. 7) for generating a unique session id (see block 522) that uniquely identifies a user access session. The connect dialer 466 may, for example, obtain the dialer id from a web server of the access broker system 454 and, in use, the connect dialer 466 increments the counter for each dial attempt so that each user access session is uniquely identified. The dialer id and a value of the counter are used to create the unique session id prefix. In order to ensure the integrity of the dialer id and value or count of the counter (which are transmitted in the clear), these fields are used to generate a checksum character. The algorithm used for generating this checksum character is described in more detail below with reference to FIG. 12. An exemplary embodiment of the unique session id is described in more detail later in this document.

The netserver 470 maintains a cache of authenticated user ids and passwords for a limited period so that subsequent authentications can be performed from the cache (see block 538). Since the secure PAP changes the user id and password for each authentication, it breaks any caching feature at the netserver 470. Thus, in certain embodiments, in order to maintain compatibility with the standardized netserver cache, the dialer 466 may store a random point locally and reuse this for limited period of time (see block 540). After the aforementioned processing, the netserver 470 communicates the authentication data to the transaction server 468.

Figure 8:
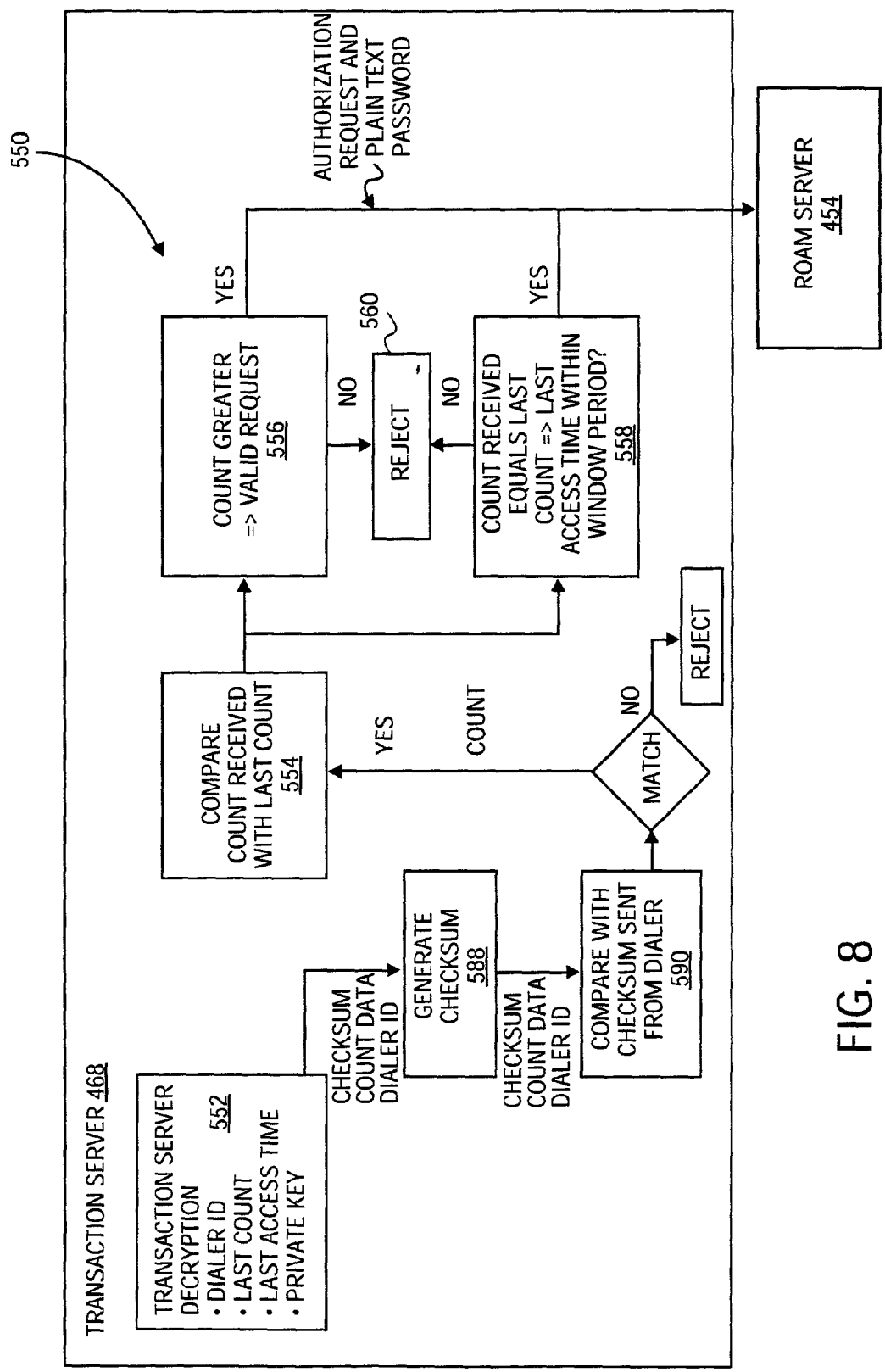
FIG. 8 is a schematic functional block diagram of a transaction server, in accordance with an embodiment of the invention, which includes decryption functionality.

Referring in particular to FIG. 8, reference numeral 550 generally indicates exemplary functionality carried out by the transaction server 468. The transaction server 468 maintains the dialer id, the last used value of the counter and the last access time in a table (see block 552). This table is used for protecting the network against replay attacks. This table is typically replicated across all transaction servers 468.

Upon receipt of the user credentials or authentication data from the netserver 470, in one embodiment of the invention, the transaction server 468 decrypts the password, and compares the received value of the counter with the value in stored in its database (see block 554). If the count sent by the dialer 466 is greater than the last count value stored in the database, then it is considered a genuine request (see block 556). If the count sent by the dialer 466 is equal to the last count value stored in the database, and the delta or time difference between the current system time and the time of last access stored in the database is less than a time window allowed, then again the request is considered genuine (see block 558). The transaction server 468 rejects the authorization request as a possible replay attack if the count sent by the dialer 466 fails these two conditions (see block 560). The transaction server 468 sends the authentication request along with the plain text password to the roam server 472 of FIG. 9.

In the embodiment depicted in FIG. 8 the transaction server 468 maintains a record of the customer's private key and, accordingly, decryption of the authentication data takes place at the transaction server 468, which may thus define a decryption server. However, certain customers may wish to not provide their private key to any intermediaries such as the transaction servers 468. In these circumstances, the customer's private key is not provided to the transaction servers 468 but rather to the customer's roam server 472 that is typically at an in-house location. Accordingly, in addition or instead, decryption of the authentication data may thus take place in a similar fashion to that described above at the customer's roam server 472. An embodiment of a roam server 472 that includes encryption functionality is shown in FIG. 9.

Figure 9:
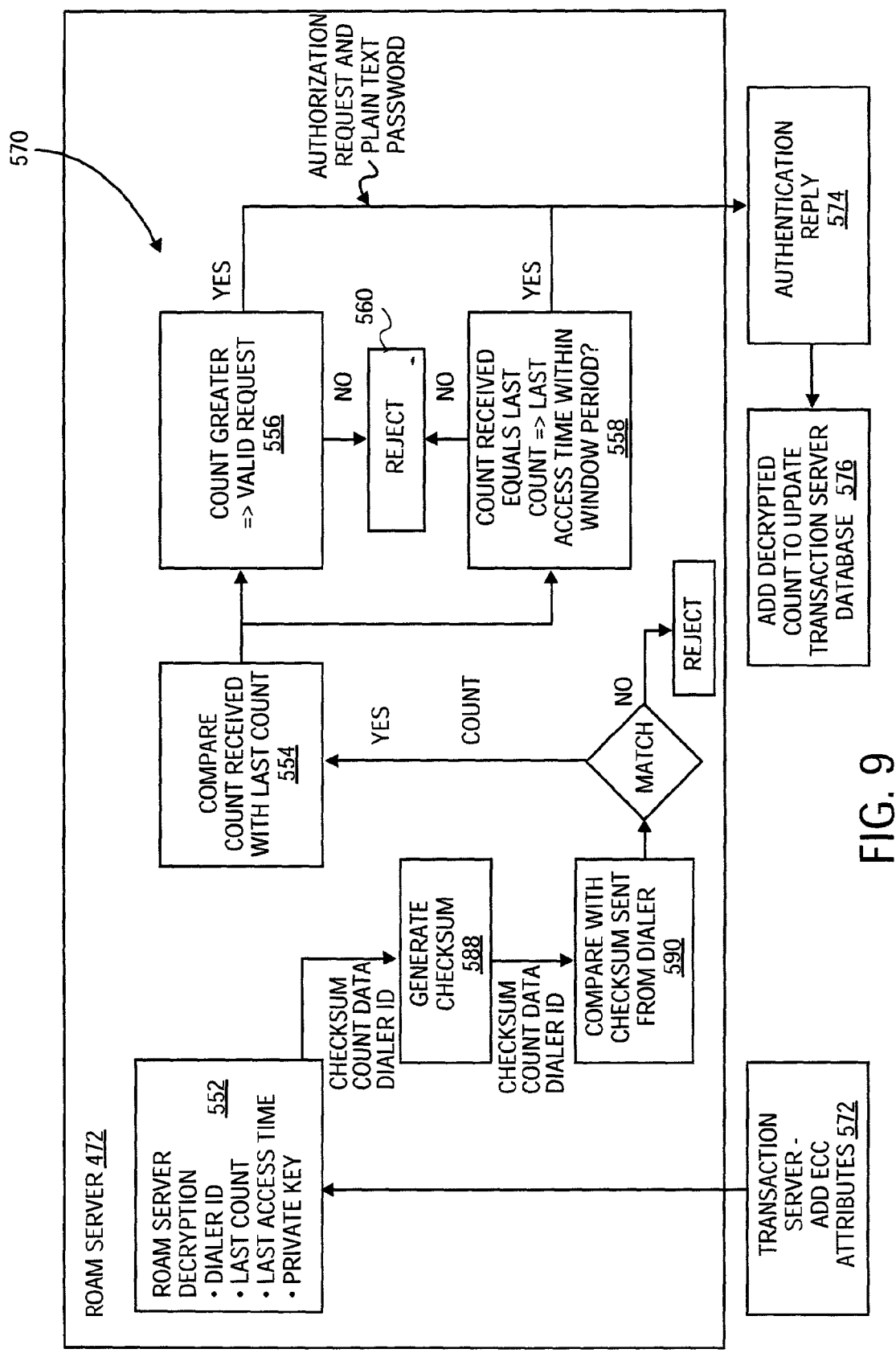
FIG. 9 is a schematic functional block diagram of customer or roam server, in accordance with another embodiment of the invention, which includes decryption functionality.

Referring in particular to FIG. 9, reference numeral 570 generally indicates exemplary functionality carried out by the roam server 472. As the functionality substantially resembles the functionality 550 of FIG. 8, like reference numerals have been used to indicate the same or similar features. When the transaction server 468 does not have access to the particular customer's private key, the transaction server 468 adds the necessary ECC attributes to the authentication request packet and sends it to the roam server 472 (see block 572). The roam server 472 decrypts the password and the checksum character using the ECC information and the private key stored locally (see block 552). The roam server 472 then performs the same functionality tests described above to determine if the count is valid (see blocks 554-560). The roam server 472 adds the decrypted count to the authentication reply packet (see block 574) so that the transaction server 468 can update its database with the latest value of the count (see block 576). Exemplary tables for implementing counter functionality are set out below.

A table dialer_counter_ts is typically used for replication. This table is created at each Transaction Server 468.

| [00089] Table: dialer_counter_ts | |
|---|---|
| FIELD NAME | DESCRIPTION |
| DIALER_COUNTER_TS_ID | A NUMERIC ID. REQUIRED FOR ORACLE SNAPSHOTS. |
| SERVER_ID | THE TRANSACTION SERVER ID. VARCHAR2(20). |
| DIALER_ID | THE DIALER ID IS OBTAINED FROM THE DIALER_ID SERVLET AT A WEB SERVER OF THE SYSTEM 454. VARCHAR2(10) |
| COUNTER | LAST USED VALUE OF THE COUNTER. VARCHAR2(5) |
| ACCESS_TIME | LAST ACCESS TIME |

The last used value is typically stored in a database instance e.g., on "SESSION" machine. The SESSION machine is typically used to pull the entries from dialer_counter_ts tables in the transaction servers 468 and aggregate them into a single table. The SESSION machine also creates a unique snapshot corresponding to every dialer_counter_ts table in the transaction servers 468. These snapshots are typically named as dialer_counter_ts_<ServerId>, where ServerId is the id of the particular transaction server 468. The exemplary database instance SESSION is created with two identical machines on either coast to enhance fault tolerance.

| TABLE: DIALER_COUNTER | |
|---|---|
| FIELD NAME | DESCRIPTION |
| DIALER_ID | THE DIALER ID IS OBTAINED FROM THE DIALER_ID SERVLET AT A SYSTEM WEB SERVER OF THE SYSTEM 454 AND IS USED FOR UNIQUELY IDENTIFYING THIS RECORD. VARCHAR2(10) |
| COUNTER | LAST USED VALUE OF THE COUNTER. VARCHAR2(5) |
| ACCESS_TIME | LAST ACCESS TIME |

Each transaction server 468 typically replicates the dialer_counter table using Oracle snapshots. When a standard system is upgraded to accommodate the present embodiment of the invention, the following exemplary modifications are typically made.

| FIELD NAME | DESCRIPTION |
|---|---|
| TABLE: SECURE_PAP | |
| SPAY_ID | GENERATED ID THAT UNIQUELY IDENTIFIED THIS RECORD. |
| CUSTOMER_ID | CUSTOMER ID. |
| PUBLIC_KEY | PUBLIC KEY. |
| PRIVATE_KEY | PRIVATE KEY VALUE. |
| KEY_VERSION | KEY VERSION NUMBER. |
| ALGORITHM | ALGORITHM. FOR EXAMPLE, E AND A. |
| EXPIRATION_DATE | TIME/DATE WHEN THIS RECORD WILL EXPIRE. IF NULL, THIS RECORD WILL NEVER EXPIRE. |
| DESCRIPTION | DESCRIPTION ENTERED FROM DCT. |
| CREATION_DATE | TIME/DATE WHEN RECORD WAS CREATED. |
| MODIFY_BY | USER WHO MODIFIED RECORD. |
| MODIFY_TIME | TIME WHEN RECORD WAS MODIFIED. |
| TABLE: CUSTOMER | |
| ENCRYPT_FLAG | 0 = ENCRYPTION IS OPTIONAL, 1 = ENCRYPTION IS REQUIRED FOR THIS CUSTOMER |
| TABLE: DIALER_PROFILE | |
| ENCRYPT_FLAG | 0 = ENCRYPTION OFF, 1 = ENCRYPTION ON |
| SPAP_ID | REFERENCES SECURE_PAP TABLE |

Encryption/Decryption Functionality.

In the embodiment described above with reference to FIGS. 7 to 9, the dialer 466, transaction server 468, and roam server 472 include an ECC API that implements the ECC algorithm and provides an API for encrypting and decrypting passwords. Typically, the ECC implementation uses optimal normal basis mathematics for encryption/decryption. In certain embodiments, polynomial basis and optimal normal basis mathematics are combined to reduce the time for a mathematical inversion to the cost of a single multiply.

Figure 10:
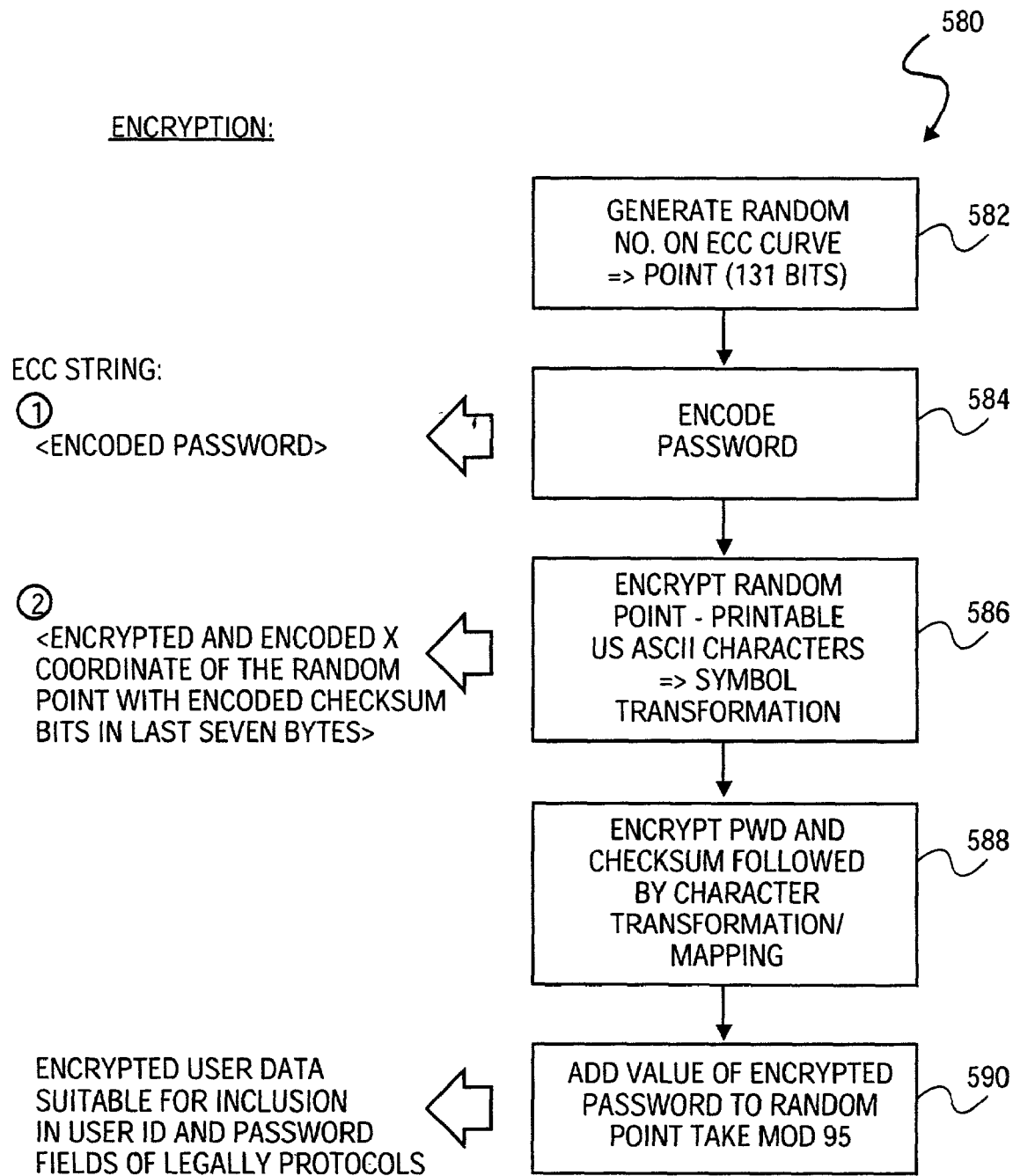
FIG. 10 is a schematic flow diagram of an exemplary encryption method performed by the connect dialer.
Figure 11:
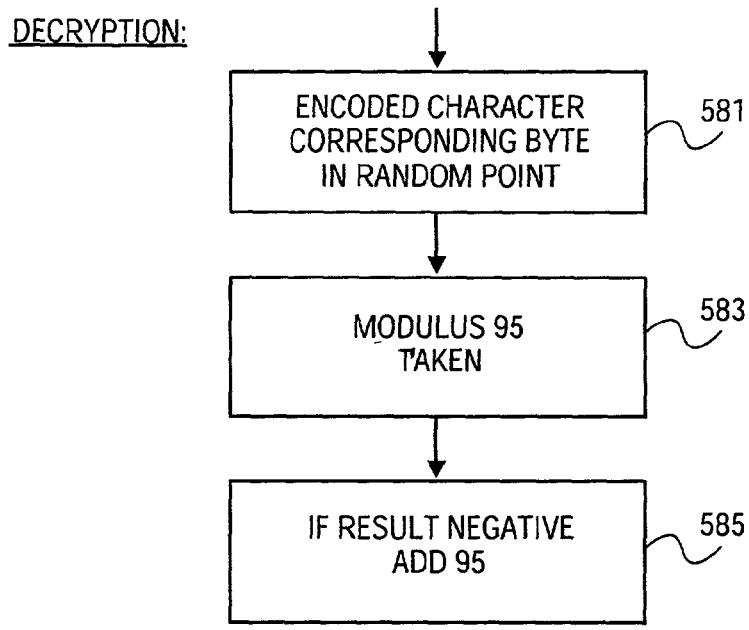
FIG. 11 is a schematic flow diagram of an exemplary decryption method performed by the transaction server or customer server.

Referring in particular to FIG. 10, reference numeral 580 generally indicates exemplary encryption functionality of the dialer 466. As shown at block 582, the encryption algorithm generates a random point on an ECC curve. This random point is then used for encoding the password and the checksum character (see block 584) to produce part of an ECC string <encoded password>. The dialer 466 encrypts the random point and transmits it to the netserver 470 (see blocks 586 and 587). Typically, a symbol transformation scheme is used for this encryption as described below.

In order to accommodate existing protocols, e.g., PPP, PAP, RADIUS, or the like, the password fields have printable US-ASCII characters. In certain embodiments, the characters are generated in such a fashion so as to conform to RFC 2486 standards. In these embodiments, when the password and checksum fields are encrypted, care is taken to generate the string with acceptable characters so that they may be applied in networks using standard protocols (see block 588). Accordingly, the following character transformation scheme may be used to perform this encoding. Each character to be encoded is first mapped into a value according to the table shown below.

| # | SYMBOL | # | SYMBOL | # | SYMBOL | # | SYMBOL |
|---|---|---|---|---|---|---|---|
| 0. | 0 | 1. | 1 | 2. | 2 | 3. | 3 |
| 4. | 4 | 5. | 5 | 6. | 6 | 7. | 7 |
| 8. | 8 | 9. | 9 | 10 | A | 11. | B |
| 12. | C | 13. | D | 14 | E | 15. | F |
| 16. | G | 17. | H | 18 | I | 19. | J |
| 20. | K | 21. | L | 22 | M | 23. | N |
| 24. | O | 25. | P | 26 | Q | 27. | R |
| 28. | S | 29. | T | 30 | U | 31. | V |
| 32. | W | 33. | X | 34 | Y | 35. | Z |
| 36. | A | 37. | B | 38 | C | 39. | D |
| 40. | E | 41. | F | 42 | G | 43. | H |
| 44. | I | 45. | J | 46 | K | 47. | L |
| 48. | M | 49. | N | 50 | O | 51. | P |
| 52. | Q | 53. | R | 54 | S | 55. | T |
| 56. | U | 57. | V | 58 | W | 59. | X |
| 60. | Y | 61. | Z | 62 | ~ (TILDE) | 63. | ` (GRAVE ACCENT) |
| 64. | ! (EXCLAMATION MARK) | 65. | # (NUMBER SIGN) | 66 | $ (DOLLAR SIGN) | 67. | % (PERCENT SIGN) |
| 68. | ^ (CARET) | 69. | & (AMPERSAND) | 70 | * (STAR SIGN) | 71. | ( (LEFT PARENTHESIS) |
| 72. | ) (RIGHT PARENTHESIS) | 73. | - (HYPHEN-MINUS) | 74 | _ (UNDERSCORE) | 75. | + (PLUS SIGN) |
| 76. | = (EQUALS SIGN) | 77. | { (LEFT CURLY BRACKET) | 78 | [ (LEFT SQUARE BRACKET) | 79. | } (RIGHT CURLY BRACKET) |
| 80. | ] (RIGHT SQUARE BRACKET) | 81. | | (VERTICAL LINE) | 82 | \ (REVERSE SOLIDUS) | 83. | : (COLON) |
| 84. | ; (SEMICOLON) | 85. | " (QUOTATION MARK) | 86 | ' (APOSTROPHE) | 87. | < (LESS-THAN SIGN) |

| # | SYMBOL | # | SYMBOL | # | SYMBOL | # | SYMBOL |
|---|---|---|---|---|---|---|---|
| 88. | , (COMMA) | 89. | > (GREATER-THAN SIGN) | 90 | ? (QUESTION MARK) | 91. | (SPACE) |
| 92. | / (SOLIDUS) | 93. | . (FULL STOP) | 94 | @ (COMMERCIAL AT) | | |

The mapped value is then added to the corresponding byte in the random point and the modulus 95 is calculated (see block 590). This results in the character being mapped to another character in the above table. To decode the character at a decryption server, the corresponding byte in the random point is subtracted from the encoded character (see block 581 in FIG. 11) and the modulus 95 of the result is calculated (see block 583). If the result is a negative number, then the value 95 is added to the result to obtain the original character (see block 585). By way of illustration, assuming "r" is the byte in the random point used for the encoding, and "x" is the original character, then,

| Encode: | $y = (x + r) \% 95$ |
|---|---|
| Decode: | $x = (y - r) \% 95$ |
| | If $(x < 0)$ then |
| | $x = x + 95;$ |

The password field and the checksum character are encrypted with the random point during the encryption process at the dialer 466. Each one of these fields uses a different set of bytes in the random point for encoding. The password field uses the first set of bytes for it's encoding, and the checksum field uses byte 10 for it's encoding.

The checksum character is used for ascertaining the integrity of the dialer id and counter values. If the dialer id and the counter value are transmitted in the clear, a malicious person can alter these values and thereby defeat the protection against replay attacks. To address this problem, a checksum character is generated from the dialer id and counter value where after it is encoded using the random point (see block 592 in FIG. 12). The encrypted checksum character is then transmitted as part of the user id string.

Figure 12:
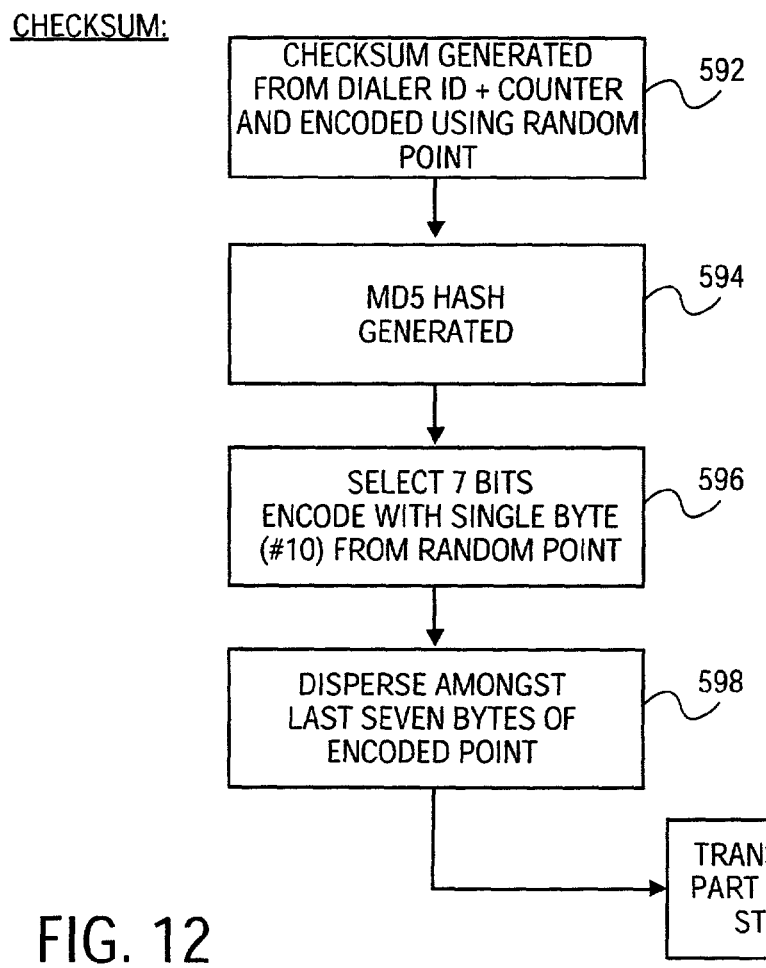
FIG. 12 is a schematic flow diagram of an exemplary encryption method of checksum data.

The checksum character is generated by the MD5 hash of the count value, the dialer id and the random point (see blocks 592 and 594 of FIG. 12). Seven bits are then selected from the hash and then encoded with a single byte (byte #10) from the random point (see block 596) using the encoding methodology described above. The encoded bits are then dispersed among the last seven bytes of the encypted point (see block 598) and transmitted as part of the user string (see block 599). When the dialer 466 sends the encoded data to the transaction server 468 or roam server 472, as the case may be, they validate the dialer id and counter value by independently generating the checksum (see block 588 in FIGS. 8 and 9) and compare it with the checksum sent by the dialer 466 (see block590) and reject if they don't match.

Returning to the dialer 466 and to FIG. 10, the encoded strings are then concatenated as follows to create an ECC string:
<encoded password><encrypted and encoded x coordinate of the random point with encoded checksum bits in the last seven bytes>

Thereafter, the dialer 466 concatenates the ECC string with the dialer id and the counter value and transmits it in the userid and password fields of the protocol, e.g. PAP. For example, <encoded password><encrypted and encoded x coordinate of the random point with encoded checksum bits in the last seven bytes><dialer id><counter value>.

It will be noted that the methodology set out in FIG. 10 produces an encrypted string that is of such a string length, and includes characters of such a nature, that the encrypted string may be communicated using LEGACY systems The encryption logic is typically encapsulated in an ip_spap_encrypt( )method with the following signature:

char * ip_spap_encrypt(const char *algorithm, const
        char public_key, const char password, const char
        *dialer_id, const char *counter, char **plain_
        point, char **encrypted_point, int *returnCode);

where
algorithm is the algorithm to be used. "S" for Secure PAP
public_key is the ECC public key (from config.ini)
password is the plain-text password
dialer_id is the id of the dialer (obtained from the dialer id servlet)
counter is the count of dial attempts (incremented by the dialer for each dial attempt)
plain_point—If this field is left empty, a new random point is generated. This field points to the random point used for the encoding on return.
encrypted_point—If this field is left empty, the plain point and the public key is used to generate the encrypted point. This field points to the encrypted point used by the method on return.
returnCode 0 if the call is successful, a non-zero code is provided. The method returns the ECC string is returned when successful and a null otherwise.

The decryption logic is encapsulated in the ip_spap_decrypt( )method. The method have the following signature:

char * ip_spap_decrypt(const char *algorithm, const
        char private_key, const char ecc_string, const
        char *dialer_id, const char *counter, int *return-
        Code);

where
algorithm is the algorithm to be used. "S" for secure pap
private_key is the ECC private key (from securepap table or esp_key_pair.txt file)
ecc_string is the string returned by the encrypt( ) method
dialer_id is the id of the dialer (obtained from the dialer id servlet)
counter is the count of dial attempts (incremented by the dialer for each dial attempt)
returnCode 0 if the call was successful; non-zero code otherwise
The method returns the plain text password when successful and a null otherwise.

Dialer Customization Form

As mentioned above, the customers 456 use a web form for requesting a customized dialer configured to communicate using Secure PAP. This web form typically contains fields that can be used for specifying the required customizations. The web form may include the following exemplary fields:
  Enable Secure PAP encryption: (Y/N)
  Public Key:
  Key Id: (0-9)
Dialer Customization Tool During the customization process, an administrator of the access broker system 454 has the option of generating a dialer 466 that will use Secure PAP. If enabled, the following exemplary fields may be set in a config.ini that is typically packaged with the dialer 466:
  [processing facility identification e.g., iPass]
  EncryptFlag=yes
  Algorithm=S
  KeyVersion=0
  PublicKey=BwAAAMGdqYx2lxhWtEQMdDHhvwU=&
  AQAAAFdd40uLQMD1UTtyBqDHY=

These values are also stored in the transaction server database so that the transaction server 468 can decrypt the password sent from the corresponding dialer 466 of a particular customer 456. In the present embodiment, only the public key is stored in this file, as the private key is kept secret for the encryption to be secure.

In addition to enabling Secure PAP, the customization tool also provides the option of setting the algorithm used and the key version. For example, the following encryption algorithms may be supported:
  A for no encryption.
  E for Elliptic Curve Encryption
  S for ECC compatible with Unique Session ID
  U for Unique Session ID In practice, A is primarily for testing and debugging purposes. E is used for encrypting the password when the dialer does not have the dialer id. U is not an encryption algorithm, but is used to identify the unique session id, as discussed in more detail below. The key version starts at zero, but is incremented every time a new key-pair is desired for an existing dialer profile. The dialer 466 stores the ECC keys and other information in a secure_pap table. This table is then replicated to the transaction server 468 via Oracle snapshots. A new key-pair is generated if the private key has been compromised. When the security of the private key is compromised, the dialer support team should take the following actions:

1. Set an appropriate expiry date for the compromised key. This should be sufficient to ensure all dialers 466 using the compromised key can still use the key one last time. The dialers 466 connect to the Internet using the old key, and retrieve the config.ini file with the new key from the update server. If the customer 456 is using the roam server 472 to decrypt the password, the customer 456 typically manually removes the compromised key from the esp_key_pair.txt file after the expiry date.

2. Generate a new key pair or ask the customer 456 to generate a new key pair and send the public key to the access broker system 454.

3. Use the DCT tool and replace the public key (use a new key id). Build the dialer.

Dialer

The dialer 466 checks the config.ini file to determine whether or not it should be encrypting passwords. If Secure PAP is enabled, then the dialer 466 encrypts the password using the public key from the config.ini file and by invoking the ip_spap_encrypt( ) method. The method creates the ECC string and returns it. The dialer 466 concatenates the ECC string with the dialer id and the counter value. The first sixteen characters of the ECC string are placed in the password field and the rest of the string is placed in the prefix field (with 0S or 0E prefix). The dialer 466 uses algorithm "E" until it obtains a dialer id. The prefix is included after all system and routing prefixes, but before the customer prefixes. The dialer 466 does not encrypt the password and does not create the Secure PAP prefix if the POP being dialed has a prefix that is not compatible with and PAP prefix in the phonebook. A sample username, which includes the encryption prefix is a follows:
  UserID: IPASS/0S Axrt50zTxca546hjdgkbxcjc^_d0we/joe@ipass.com
  Password: x35~!4Qu{xy71]D8
  where KeyVersion=0 and Algorithm=S.

If the access broker system 454 determines that no encryption is needed, it creates a unique session id from the dialer count and places it in the prefix field. A sample username, which includes the unique session id prefix is as follows:
  UserID: IPASS/0UAxrt5AB2/joe@ipass.com
  Password: thisisabigsecret
  where KeyVersion=0 and Algorithm=U.

The dialer 466 stores the plain_point and the encrypted point in its local storage.

When a redial is attempted, the dialer 466 increments the counter and invokes the ip_spsp_encrp( ) method using the plain point, and encrypted point.

Customer Resolution

The customer resolution process checks for a prefix of the form [0-9][A-Z]*/ If no such prefix is found, and the customer 456 does not require password decryption, the customer resolution operates as normal. If the prefix is found, the last 8 bytes up to the first slash (/) are stripped out and stored as the unique session id field. The customer resolution code may create the unique session id field with the following contents: 0S<dialer_id><counter>. The integer is stripped and stored as key identifier field. The algorithm is stripped and stored as a separate field.

Dialer Counter Replication

Secure PAP embodiment depicted in the drawings uses the dialer_counter table for protection against replay attacks. Each transaction server database contains a dialer_counter_ts table. The transaction server 468 inserts a new row into this table whenever it receives a successful authentication request with a Secure PAP prefix. The contents of this row include the server_id, the dialer_id, the counter and the system time (in GMT).

The SESSION database contains a snapshot for the dialer_counter_ts table at every transaction server 468. These snapshots are typically named: dialer_counter_ts_<SERVER_ID>, where <SERVER_ID> is the id of the particular transaction server 468.

A "refresh" tool is provided for refreshing the snapshots from the transaction servers 468. The dialer_counter_ts_<SERVER_ID> would have "ON INSERT" PL/SQL trigger that would update/insert the dialer_id, counter, and access_time from the inserted row into the dialer_counter table if the value of the counter being inserted is equal to or greater than the value of the counter in the dialer_counter table. The transaction servers 468 use the refresh tool to refresh the dialer_counter snapshot from the SESSION database. The dialer_couter table is then cached by the transaction servers 468 for faster access. Any changes to records in dialer_counter table at runtime take immediate effect. This is accomplished using the same mechanism used in other components of the access broker system 454 using database triggers and the cache_update table.

Transaction Server

On startup, the access broker system 454 reads all private keys from the database into a local cache for efficient lookup.

It also has an additional attribute in the customer cache to indicate if a certain customer 456 requires password encryption or not. The transaction server 468 also caches the dialer_counter table. Any changes to records in these tables at runtime take immediate effect. This is accomplished using the same mechanism used in other components of the access broker system 454 using database triggers and the cache_update table.

If the encrypted prefix field specifies the 'S' algorithm, the transaction server 468 concatenates the contents of the password field to the encrypted prefix field constructed by the customer resolution process and creates the "ECC field". The ECC field contains <encoded password><encrypted and encoded x coordinate of the random point><encoded checksum character>

The transaction server 468 locates the private key for the appropriate customer 456 using the key index. If the private key is found in the database, it calls the ip_spap_decrypt( ) method to decrypt and decode the password. The password field is then overwritten with the plain-text password before it is sent to the roam server 472.

If the private key is not located in the cache, the transaction server 468 typically adds the following fields to the authentication request packet and sends it to the roam server 472: algorithm, key index, the ECC field (as password), dialer id, counter, value and access time of the counter last used (from the database), and the "decrypt_at_roamServer" flag set to "yes".

The transaction server 468 then stores the authentication details in the ip_auth_trans table and the dialer_counter details in the dialer_counter_ts table. The Transaction server 468 typically inserts a new dialer_counter_ts record every time as inserts are usually faster than updates.

When the transaction server 468 receives the account request, it uses the customer resolution process to create the unique session id and adds it to the packet as "ipass_session_id". The tr_userid field contains the raw_userid.

ESP Tool

The ESP command line tools are used by the customers 456 in conjunction with their roam servers 472, the DCT team, and the QA team to generate public/private key pairs and test the encryption and decryption algorithms.

esp_genkey (for customers 456 with roam servers 472):

This tool prints the public/private ESP key pair to a file named esp_key_pair.txt. This file resides in the /usr/ipass/ keys directory on Unix, and in the IPASS_HOME/keys directory for Windows. The keys must also be submitted to the access broker system 454 via, for example, a secure website so that the dialer 466 can be built with the public key. Typically, a secure backup of the private key is also maintained.

esp_genkey_dct:

This tool prints the public/private ESP key pair to standard output. It is printed in a format that meet the requirements of the DCT. An example output is:

1
Public
Key:
BgAYVK1azUt8comk41GzLw=&ADIkGfMgNChM4vY6+nLgTqo=

Private Key:AQAAAAZOSNH13PaG3NuqGbU7TYO=

The first line contains a "1", indicating success in key generation. When an error occurs, that output is then of value "0".

esp_qa:

This tool has several command line options available for testing the ECC API. An example sample of the option supported:

esp_qa genkey
esp_qa encrypt [-a <algorithm> -d <dialer_id> -c <counter>] -k <public_key> -t <text>
esp_qa decrypt [-a <algorithm> -d <dialer_id> -c <counter>] -k <private_key> -t <text>
esp_qa testipg [-a <algorithm> -d <dialer_id> -c<counter>] -k<public_key> -t <text> -u<uid@domain>
esp_qa test -t <text>

Option in brackets[ ] are optional. Each esp_qa command are described as follows:

genkey—Generate a public/private key pair.
encrypt—Encrypt text (password) with the given public key.
decrypt—Decrypt text (password) with the given private key.
testipg—Executes the "Encrypt" then runs the check-ipen command for the given user.
test—Basic ECC API test. Runs the genkey, encrypt, and decrypt for algorithm S.

Roam Server

The roam server 472 typically checks for the presence of the "decrypt_at_roamserver" field in the packet received from the transaction server 468. If the field is present, the roam server uses the "key index" field from the packet and fetches the private key from the esp_key_pair.txt file. The ECC string along with the private key, dialer id and counter value is passed to ip_spap_decrypt( ) method. The ip_spap_decrypt( ) method decodes and decrypts the password. The plain text password is then used by the roam server 472 to authenticate the user.

Returning to FIG. 6, once the dialer 466 has performed the methodology set out above, the authentication data is communicated to the NAS 532 where after it is sent to an authentication server 600 of the remote ISP 506. In the normal course of operations, the NAS 532 at the remote ISP 506 would reject the supplied authentication information. However, as illustrated in FIG. 6, the netserver 470 intercepts the authentication information to facilitate recognition of this authentication information as a roaming user authentication request and not a regular user request.

The authentication server 600, in conjunction with the netserver 470, parses the received authentication information to determine a roaming domain name or routing prefix associated with the roaming user 502. Should such a domain name or prefix be present, the user's authentication information is encrypted as set out above, and sent from the netserver 470 to the transaction server 468 via a secure socket layer (SSL).

The transaction server 468 may use a customer routing prefix in the session identification to route the request. Instead, the transaction server 468 may perform an Internet Protocol (IP) look-up and routes the authentication request to an appropriate home ISP 504. More specifically, the transaction server 468 receives the encrypted authentication request from the netserver 470 at the remote ISP 502, and decrypts this request as described above with reference to FIGS. 7 to 9. The transaction server 468 then determines the "home" ISP 504 by matching the roaming domain name or routing prefix of the desired home ISP 504 against a current list of participant domain names and IP addresses. If the match is successful, the authentication request is encrypted and sent via SSL to the roam server 472 that resides at the home ISP 504. In the event that the identified roam server 472 does not respond within a specific period, the transaction server 468 will attempt to contact an alternative roam server 472 at the ISP of the relevant domain.

The roam server 472 at the home ISP 504 then decrypts the authentication request sent from the transaction server 468, as described above, and submits the authentication request to the home ISP's regular authentication server 602 as if it were a terminal server or NAS 532 owned by the home ISP 504 using a customer prefix. The authentication server 602 of the home ISP 504 responds to the request by providing an "access permitted" or an "access denied" response based on the validity of the user name and password included within the authentication request (see FIG. 8). The response from the home ISP's authentication server 602 is received by the roam server 472, encrypted, and sent back to the transaction server 468.

Unique Session Identification

An exemplary method and system to associate a plurality of transaction data records is described below. The method and system describes the generation and use of a unique session id which is typically used in combination with the encryption/decryption methodology described above.

As mentioned above, communication protocols such as, for example, Point-to-Point protocol (PPP), Password Authentication Protocol (PAP), Challenge-Handshake Authentication Protocol (CHAP), Remote Authentication Dial In User Service (RADIUS) protocol, Terminal Access Controller Access Control System (TACACS) protocol, Lightweight Directory Access Protocol (LDAP), NT Domain authentication protocol, Unix password authentication protocol, HyperText Transfer Protocol (HTTP), HyperText Transfer Protocol over Secure sockets layer (HTTPS), Extended Authentication Protocol (EAP), Transport Layer Security (TLS) protocol, Token Ring protocol and Secure Remote Password protocol (SRP) make provision for a user identification string. Although the size or length of characters that each different protocol allows may vary, the lowest common denominator in size supported by the exemplary protocols listed above is typically about 63 characters. In these circumstances, provision of a unique user session identification would enhance authentication, accounting and SQM processing.

In the application of above protocols to the exemplary multi-party service access environment 450, the user identification string is included, and is thus common, in all relevant transactions data records generated by the various participants, such as the transaction servers 468, the service providers 452 and the customers 456. However, in certain circumstances, although the prior art user identification string used in these protocols may be uniquely associated with a particular user of multi-party service access environment 450, it is not uniquely associated with a particular single user session. For example, due to network timeouts and packet retry algorithms, it is often the case that a single transaction data record is sent to a transaction servers 468 several times and, if any one or more of these records is defective, multiple instances of a record relating to the same single user session may exist at the settlement system 474. Further, in an attempt to re-send a perceived failed communication attempt, certain NASs 470 (see FIG. 6) actually change the user session identification string thereby resulting in different transaction data records for the same single user session. The aforementioned are merely two examples of unsatisfactory accounting records but it will be appreciated that there may be a host of other circumstances.

In accordance with another embodiment of the present invention, relevant transaction data records generated in response to a single user session include a common unique session identification. In certain circumstances, this session identification may provide strong, but not necessarily absolute identification of an individual user's usage information and the unique user session identification should at least be unique within certain parameters. For example, the unique user identification my be unique for a given time period so that all records generated during that time period may be associated and processed using the unique user session identification.

Typically, for the exemplary protocols mentioned above, the user identification string includes, not only a user name and password of the user accessing the network, but also routing information including the customer realm. The user ID or identification string used in the exemplary multi-party service access environment 450 is typically as follows:

<FacilityRoutingPrefix>/[<FacilityLocationPrefix>]/
[<CustomerRoutingPrefix>]/[CustomerPrefix
(s)]/<EndUserName>@[<NonRoutingCustomer-
Domain>]|[<CustomerRoutingDomain>]

Wherein,

<FaclityRoutingPrefix> is a proprietary prefix that is used by the ISPs 458, wireless access providers 460, content distribution provider 462, E-Commerce provider 464, or the like (the access providers) to route traffic to the network of the access broker system or facility 454.

<FacilityLocationPrefix> is a prefix used by the facility to determine the location of points or nodes providing access to the facility 454.

<CustomerRoutingPrefix> is a prefix used by the access or service providers 452 to route traffic to the customer site.

<CustomerPrefix(s)> is a/are prefix(es) used by the customer 456 for their internal routing.

<EndUserName> is the login user name of the end user 502 using the facility 454.

<CustomerRoutingDomain> is a domain used by the system 454 to route traffic to the customer site. The user ID string includes either the <CustomerRoutingPrefix> or the <CustomerRoutingDomain>.

<NonRoutingCustomerDomain> is a domain used by the customer 456 for their internal routing.

An example of one of the possible ways of fitting the unique session identification in the user identification field of one of the above protocols is now described. It will however be appreciated that the inclusion of the unique session identification may be implemented in other ways. An example of an alternative solution is implemented when the dialer uses the E type algorithm for password encryption. The E type algorithm includes the encrypted random point in the username. The encrypted random point provides strong, but not necessarily absolute identification of the individual users session, and so is used as the unique session id.

As mentioned above, the lowest common denominator available string length for proprietary information supported by the exemplary protocols is typically about sixty-three characters. The unique session id should fit within the limits imposed by the username field.

Figure 15:
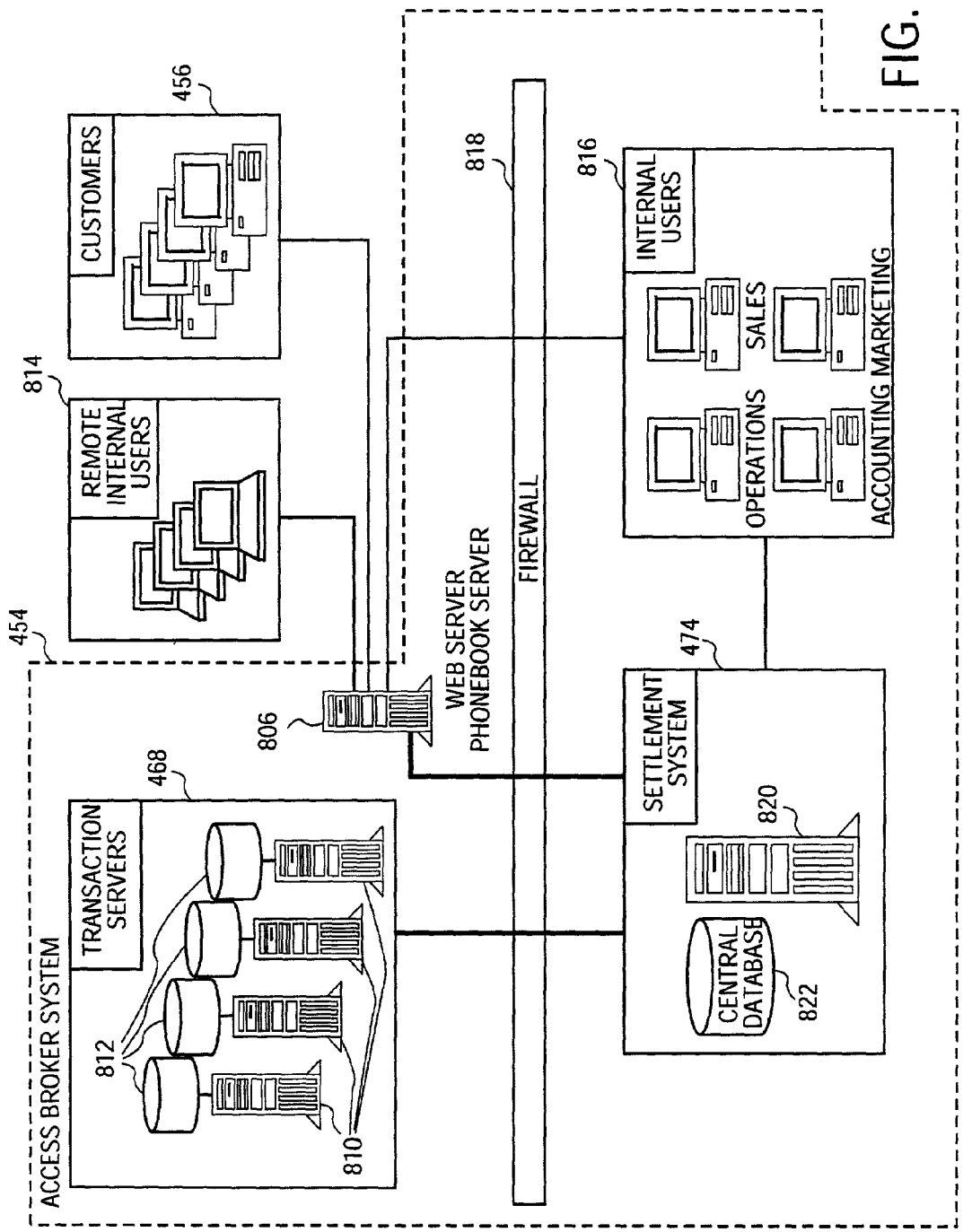
FIG. 15 is a schematic block diagram of exemplary physical architecture of the access broker system of FIG. 14.
Figure 20:
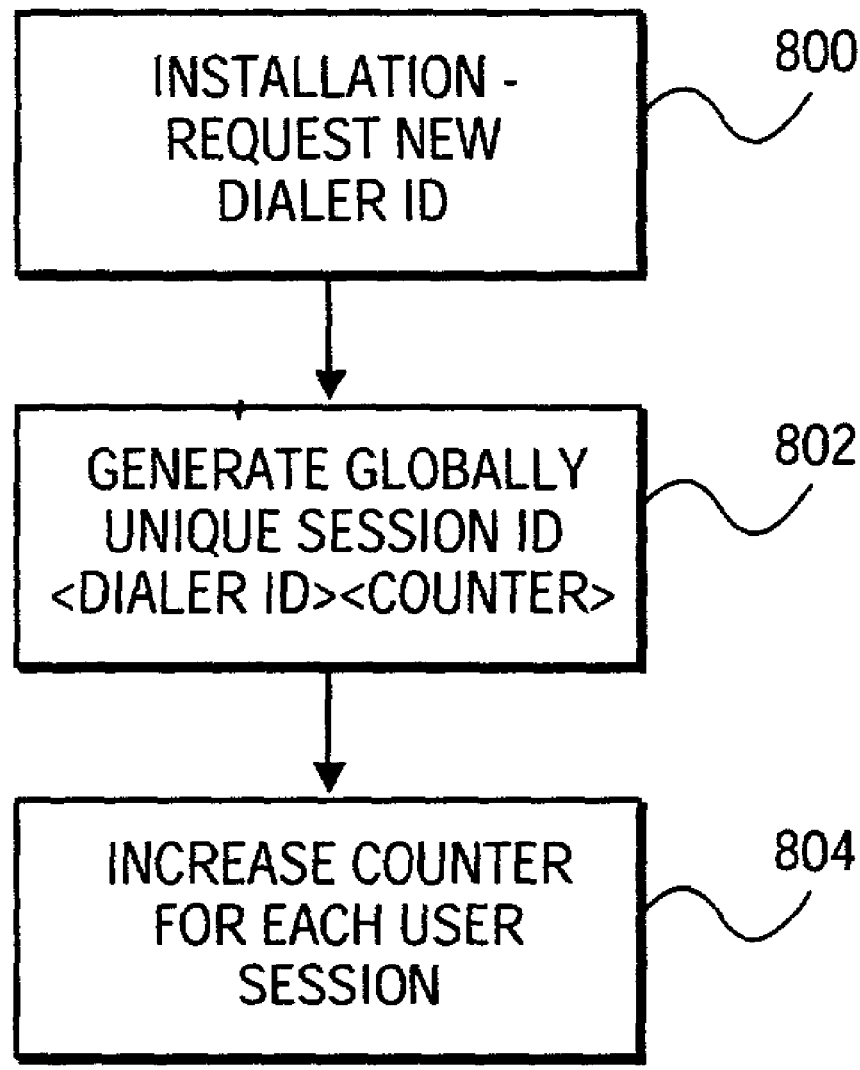
FIG. 20 shows a schematic flow chart of unique session identification methodology at a connection application also in accordance with an embodiment of the invention.

In order to generate the unique session identification (see block 802 in FIG. 20), the connection application 466, in the exemplary form of a connect dialer, resident at each service provider 452, obtains a dialer identification which identifies the connect application 466 from a servlet in the web server 806 of the access broker system 454 (see FIG. 15). The dialer identification is typically also a unique dialer identification. The dialer identification is stored in a user preference file and, when the dialer is initially installed; the dialer identification in the user preference file is typically empty. The first time the dialer 466 connects, for example, to the Internet, it typically requests a new dialer identification from the web server 806 (see block 800). In the embodiment shown in the drawings, the dialer does not create a unique session identification until it obtains the unique dialer identification from the web server 806. Accordingly, in this embodiment where the dialer identification forms part of the unique session identification, the first successful session from the dialer 466 would not contain a unique session identification. The dialer 466 would however have its dialer identification for any subsequent attempts.

Figure 18:
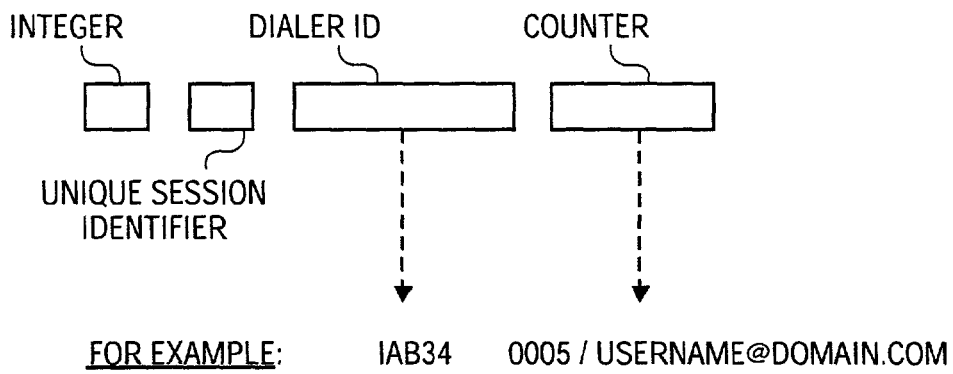
FIG. 18 shows an exemplary unique session identification in accordance with one embodiment of the invention.

In addition to its own dialer identification, the dialer 466 also includes a counter 467 that is internally maintained and stored in the user preference file. The counter 467 is incremented for each dial attempt (see block 802). The dialer 466 using its dialer identification and the counter generates a session identification indicator, defined by eleven characters (see FIG. 18) in the present embodiment, at each subsequent dial attempt. As the counter 467 is incremented at each dial attempt, the dialer generates a globally unique session identification: <dialer id><counter>(see block 802). In this embodiment, the session identification is prefixed by an identifier, e.g., three characters such as "OU" associated with the facility or access broker system 454, which are stripped off by the transaction server 468 before the user identification string is passed onto the roaming server 472 (see FIG. 5). Thus, when the unique session identification includes eleven characters, eight characters would be available for the dialer identification and counter.

Both the exemplary dialer identification and counter use numbers with radix 64. The symbols used for this numbering scheme include A-Z, a-z, 0-9, & and ^. The counter 467 is incremented prior to each dial attempt and the dialer identification is pre-filled with zeroes and, in the present embodiment, defined by a five digit entry. Accordingly, three digits remain for the counter 467. Accordingly, the five digits used for the dialer identification would enable 1073741824 unique dialer installs (more than a billion) and the three digit counter enables 262144 dial attempts (the counter would reset after 23 years, assuming 20 attempts a day). During this period, the session identification would thus uniquely define each user session. It is however to be appreciated that the number of characters allocated or used for the unique session identification may vary from system to system dependent upon the type or types of protocols that the system accommodates.

Transaction Record Processing

Figure 14:
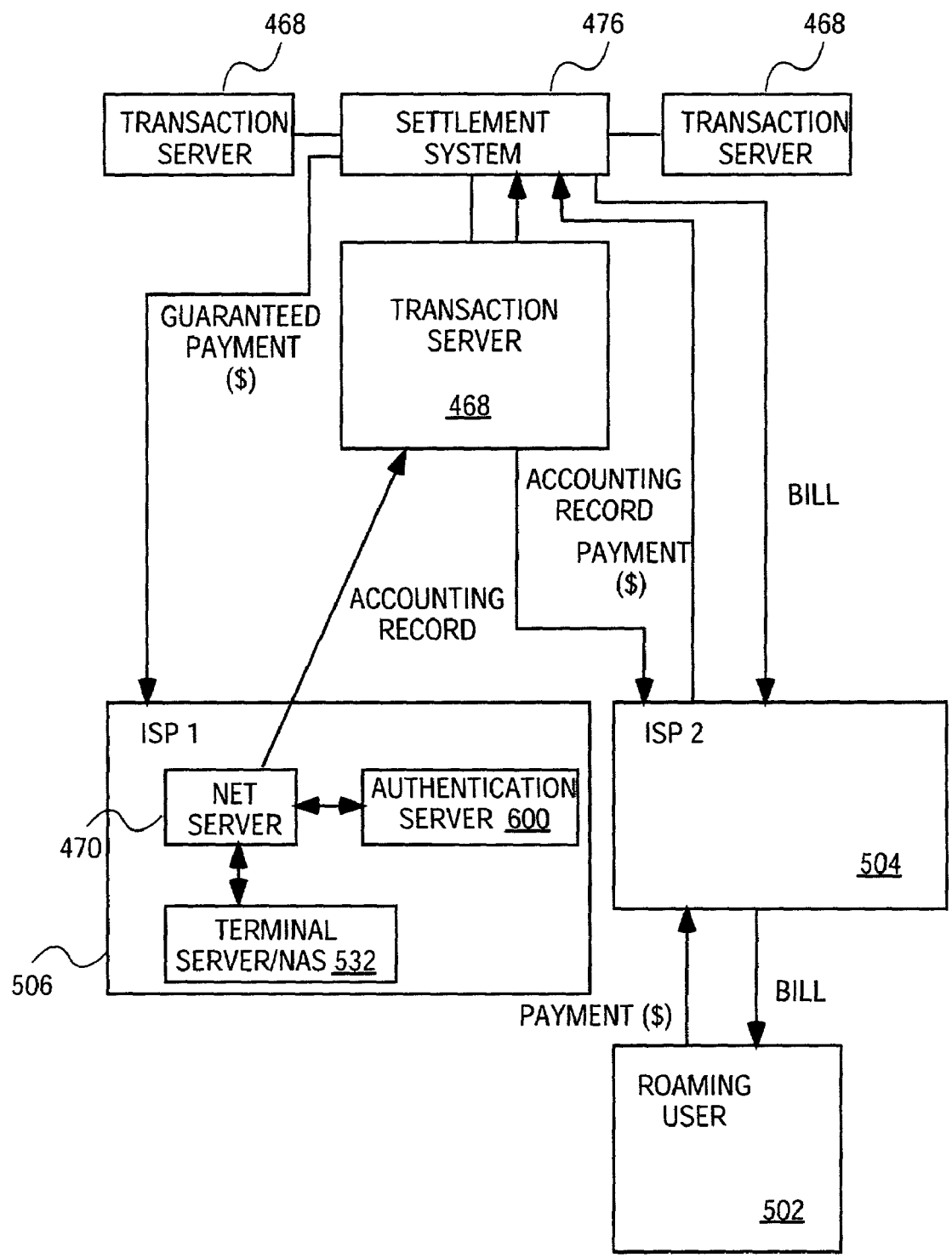
FIG. 14 is a schematic block diagram illustrating operation of an access broker system to provide roaming Internet access, in accordance with one embodiment of the invention.

FIG. 14 is a block diagram illustrating the accounting and settlement procedures, according to an exemplary embodiment of the present invention, which may be facilitated by the access broker system 454.

When a roaming user 502 connects to the remote ISP 506, the terminal server (or NAS) 470 managing the session generates a transaction data record that includes the user identification string, and thus the eleven character unique session identification, and sends this information to the authorization server 600. The authorization server 600, in conjunction with the netserver 470, parses the accounting information to determine a roaming domain name and prefix associated with the roaming user. Should such a domain name or prefix be present, the user's accounting information is encrypted using an algorithm from RSA Data Securities, and sent from the netserver 470 to a transaction server 468 via secure socket layer (SSL).

When a roaming user 502 disconnects from remote ISP 506, the terminal server (or NAS) 470 managing the session generates a transaction data record that includes the user identification string, and thus the eleven character unique session identification, and sends this information to the authorization server 600. The authorization server 600, in conjunction with the netserver 470, parses the accounting information to determine a roaming domain name and prefix associated with the roaming user. Should such a domain name or prefix be present, the user's accounting information is encrypted using an algorithm from RSA Data Securities, and sent from the netserver 470 to a transaction server 468 via secure socket layer (SSL).

A transaction data or accounting record is then communicated, in near real-time, to the transaction server 468 utilizing SSL, where the accounting records are stored in the database. All the various components or participants in the multi-party service access environment 450 receive the user identification string, and thus the unique session identification, which then accompanies the transaction data record associated with the single user session when the transaction data record is sent to the settlement system 476. Thus, transaction data records sent from various different participants include an identifier that identifies the single user session from which they arise.

These accounting records are further processed by the settlement system 476 to produce Call Detail Records (CDRs). Each call detail record provides detailed usage reporting regarding the identity of the roaming user 502, when the relevant service access occurred, the location of the service access, the length and cost of each service access session, and the time of the service access (e.g., local or GMT time).

Multiple transaction servers 468 provide accounting or transaction data records to the settlement system 476, which utilizes these records to generate bills (or invoices) to customers 456, and also to make payments to service providers 504. It is, however, to be appreciated that accounting information sent to the transaction server 468 may, for various reasons, be incomplete, differ from one ISP to the next, be sent more than once and so on. Thus, a variety of different, and possibly incomplete, records relating to the same single user session may be received by the transaction server 468.

Naturally, identifying or associating all transaction data records arising from a particular user session is advantageous in that the settlement system 474 generates bills and distributes them among customers 456 so that they can make payments to the settlement system 474, and in turn bill their customers if appropriate. Similarly, the settlement system 474 makes payments to the remote (or visitor) ISPs or other service providers 452 for accrued access time used by roaming users. The settlement system 474 may further guarantee payment for authorized use by a roaming user. An operator of the settlement system 476 thus acts as a secure, trusted entity providing a mechanism for facilitating financial settlement of service access transactions between multiple parties. The settlement system 476 implements numerous automatic functions and operations so as to enable the settlement in a timely, automated and convenient manner. Further details regarding the operation of the settlement system to facilitate such settlement or service access transactions will be described in detail below.

Physical Architecture

FIG. 15 is a diagrammatic representation of the physical architecture of the access broker system 454, according to an exemplary embodiment of the present invention. Multiple transaction servers 468 are shown to reside on one or more server machines 810, each of which has access to an associated database 812. A web server and phonebook server reside on the server machine 806, and are accessible by remote internal users 814 and the customers 456. The web server operates to generate and deliver web pages (e.g., HTML documents) to both the remote internal users 814 and the customers 456. As described above, in one embodiment of the invention, a servlet on the web server residing on machine 806 provides a unique connection application identification, in the exemplary form of a dialer identification, to each dialer or connection application 466 residing with the services providers 452. The phonebook server (part of the phonebook management system 480) operates to maintain and update the electronic phonebooks of customers 452, and accordingly both receives and publishes updates to and from service providers 452, and publishes such updates to customers 456.

The settlement system 476, and a collection of internal users 816 are shown to reside behind a firewall 818. Specifically, the settlement system 474 is hosted on one or more server machines 820 that have access to a central database 822.

Overview—Settlement System

Figure 16:
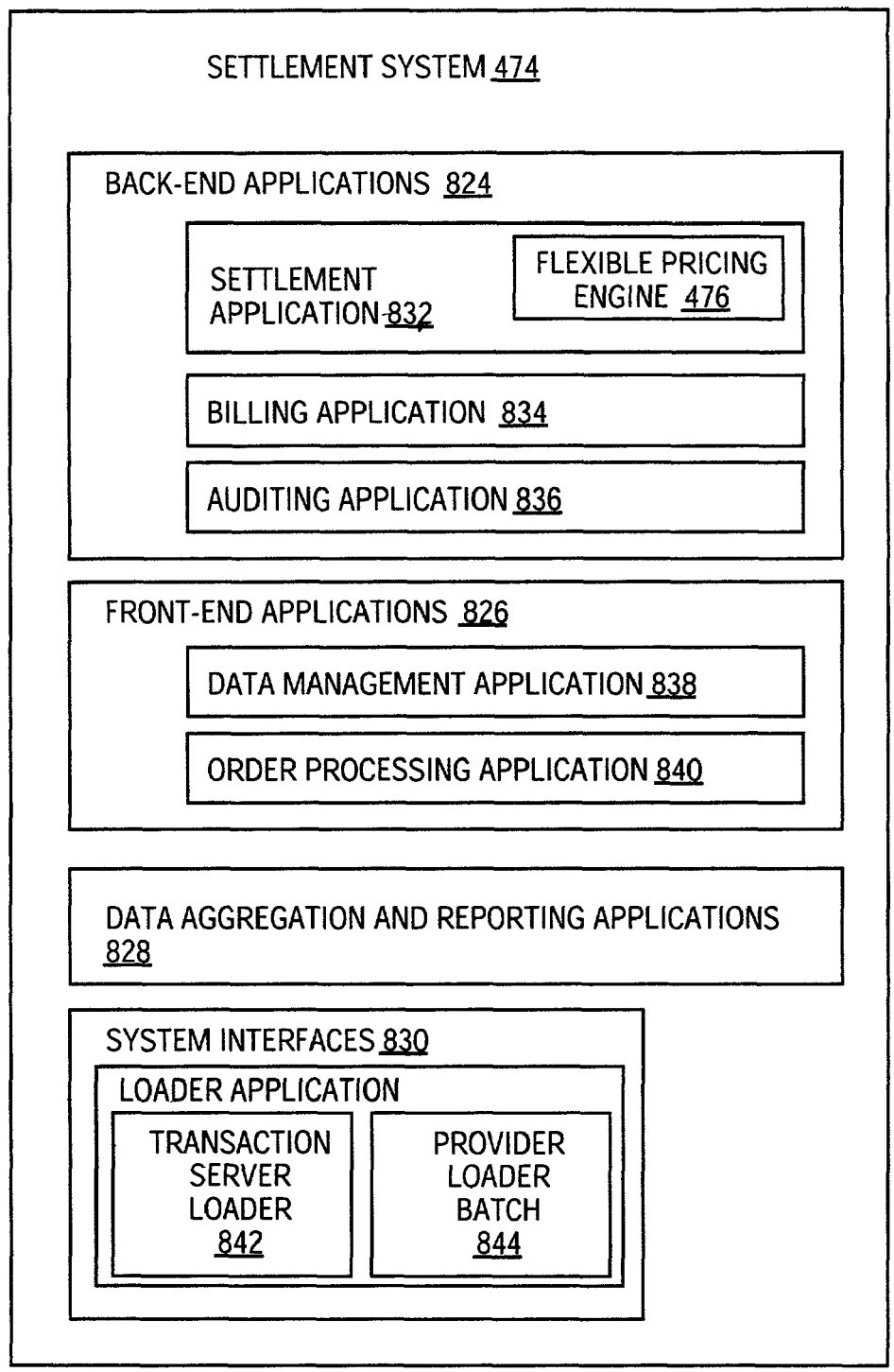
FIG. 16 is a schematic block diagram of an exemplary settlement system.

FIG. 16 is a block diagram illustrating the architecture of a settlement system 474, according to an exemplary embodiment of the present invention. The settlement system 474 comprises a back-end applications 824, front-end applications 826, data aggregation and reporting applications 828 and system interfaces 830.

The back-end (or server-side) applications 824 are shown to include a settlement application 832 that determines a transaction price, updates account balances for all parties involved in a transaction, and verifies credit limits, a billing application 834 that closes an accounting cycle, applies periodical fees, generates billing reports, including invoices and call detail records (CDRs), and publishes billing reports to the web, and an auditing application 836 that verifies business rules and structural integrity of the central database 822. The settlement application 832 is shown to embody the flexible pricing engine 476.

In the present embodiment, the settlement application 832 is responsible for normalization, summarization and verification functions. The normalization function includes converting accounting data received from multiple transaction servers 468 into a single format CDR to be used for billing, identifying parties involved in a service access transaction, and defining the price that the access broker system 454 owes to a provider 452 and the price that a customer 456 owes to the access broker system 454 for a particular service access transaction. The summarization function involves applying buy and sell prices to account balances for all parties involved in a service access transaction, and updating appropriate account balances. The verification function includes the verification of credit limits.

The settlement system 474 operates to provide near real-time settlement of service access transactions to allow for the near real-time revenue and account tracking by both providers 452 and customers 456.

In certain embodiments of the invention, the settlement system 474 includes the flexible pricing engine 476 that supports a flexible pricing model, which has the following features:

1. A variety of data structures dependent on, for example, the customer 456, the service provider 452, the location of the service access, the type of service access (e.g., dialup modem, ISDN, DSL), or usage accumulated during a particular cycle for a particular customer 456.

2. Any combination of (a) usage (e.g., a function of rate and session length); (b) transactional (per transaction); and (c) subscription-based or flat pricing (e.g., one price for all usage during a billing cycle for a customer 456 or one or more prices per each user for a customer during a billing cycle).

3. Offered discounts and promotions.

4. A variety of fees, such as start-up fees, monthly fees and minimum monthly commitments.

5. Multi-tiered pricing schemes, or intra-provider roaming, where buy and sell rates for a particular location depend on the provider 452 and whether the service user/customer 456 of the service access belongs to a further customer 456, its affiliate, or their customer.

The flexible pricing engine 476 is database-driven, thus allowing implementation of new pricing models by loading the appropriate plan into pricing tables (not shown) maintained within the central database 822. More specifically, the flexible pricing engine 476 facilitates a multi-tiered pricing model, whereby rates for a single service access transaction may be applied across multiple tiers of consumer (or customer) according to multiple criteria. These criteria may include, inter alia, any combination of usage (e.g., accumulated usage time or value total) pricing and transactional (e.g., an accumulated total number of transactions) pricing.

Returning now to FIG. 16 and the front-end applications 826, a data management application 838 is utilized by various functional units of the access broker to perform business processes and to view data for information purposes. To this end, data management application 838 may provide various user interfaces to manage information related to customers 456 and access points, and to perform accounting and administrative functions.

An order processing application 840 provides user interfaces to customers 456 (e.g., solution partners 488 or resellers) to place orders for new corporate customers.

The data aggregation and reporting applications 828 include several processes that summarize data on a daily or monthly basis to enable operational, functional and network load reporting.

The system interfaces 830 have a loader application that includes a transaction server loader 842, a provider loader 844 and accounting system interfaces (not shown). Dealing first with the transaction server loader 842, a "data loader" component pulls accounting records in the form of transaction data records, including the unique session identification, from the databases 812 of the respective transaction servers 468 to the central database 822 for processing. Multiple transaction server or batch loaders 842 may be implemented as distributed database links, and the accounting or transaction data records are pulled via the loaders 842 in near real-time.

Overview—Data Model

Figure 17A:
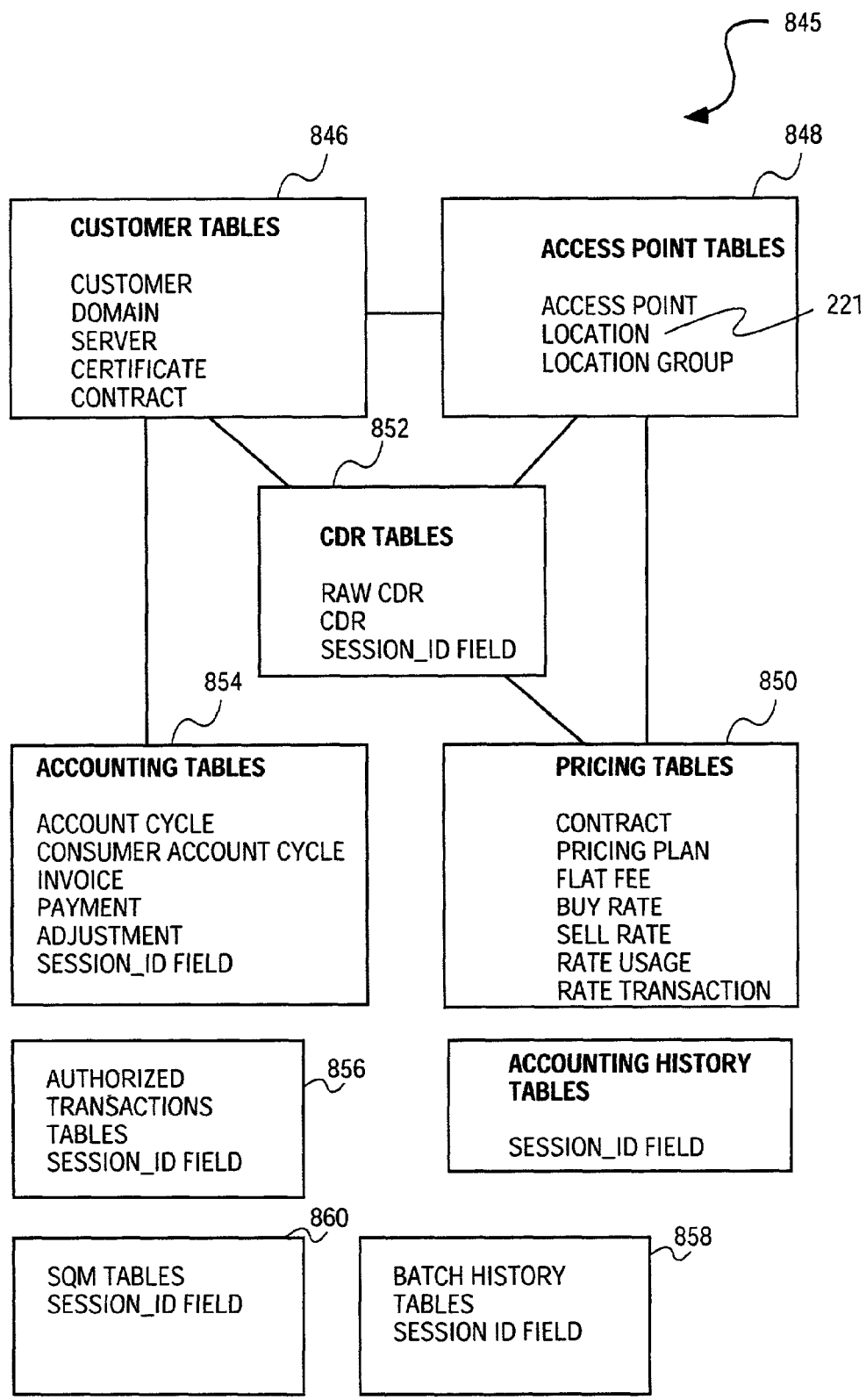
FIG. 17A shows an exemplary data model used in the access broker system.

FIG. 17A is a block diagram illustrating an exemplary data model 845 including customer tables 846, access point tables 848, pricing tables 850, CDR tables 852, accounting tables 854, authentication transaction storage area or tables 856, batch history storage area or tables 858, and SQM storage area or tables 860.

The network components in the access broker system 454 may, in certain embodiments, strip the routing prefixes from the transaction data records. Some of these components may also truncate the user identification string. The Unique session id prefix is neither a routing prefix nor at the end of the username, hence it is neither stripped nor truncated The user identification string is thus processed to remove these defects before it is used to uniquely define the user session. A modified user session identification is constructed using as many of the following components that are available:

<AuthCustomerId>/<UniqueID>/[CustomerPrefix(s)]/
<EndUserName>@<NonRoutingCustomer Domain>

Wherein,

<AuthCustomerId> is the authenticating customer identification, produced by the customer resolution process.

<UniqueID> is the unique session identification code, 0Uxxxxxxxx/, prefix generated by the connection application 466 as described above.

<CustomerPrefixe(s)> are prefixes used by the customer for their internal routing as described above.

<End User Name> is the user identification of the end user connecting to the access broker system 454 as described above.

<NonRoutingCustomerDomain> is the domain used by the customer for internal routing, as described above.

Figure 17B:
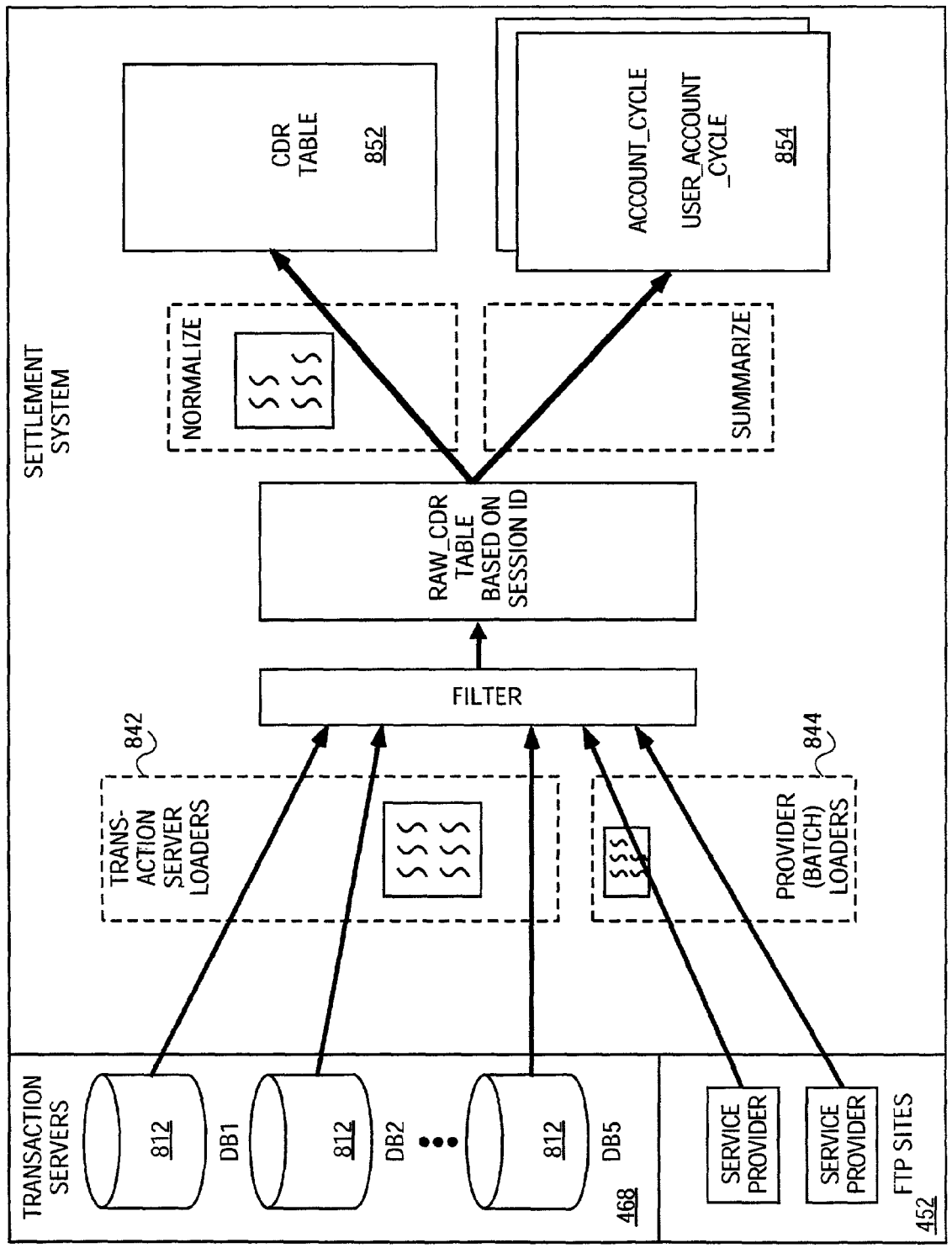
FIG. 17B is a schematic diagram illustrating processing, in accordance with the invention, using a unique session identification also in accordance with the invention.

Referring in particular to FIG. 17B, provider loader 844 receives call detail records (CDRs) or transaction data records, including the unique session identification, from the providers 452 in a batch form. This CDR data is preprocessed by the provider loader 844, which may retrieve the data from an appropriate FTP site and convert it into the same format as the data received from the transaction servers 468. In particular, the transaction server 468 constructs, each time a user access session is authorized as described above, a modified user session identification and stores it a session_id field in authentication transactions tables 856 and a session_id field in account transaction tables 854 (see FIG. 17A). It will be appreciated that, for each modified session identification stored in the authentication transactions table 856, corresponding transaction data records should be received by the settlement system 474 for processing. In a similar fashion to the transaction server 468, the batch loaders 842, 844 respectively construct or build a modified transaction data record from each transaction data record received from the transaction servers 468 of the service providers 452 (see FIGS. 5 and 17B). The modified session identification from the loaders 842, 844 are stored it in a session_id field in the batch history tables. Likewise, the SQM process constructs the modified session identification and store it in a session_id field in an SQM table 860.

The use of the unique session identification including its unique code may be used in addressing the following issues.

Missing Accounting Records

Figure 19:
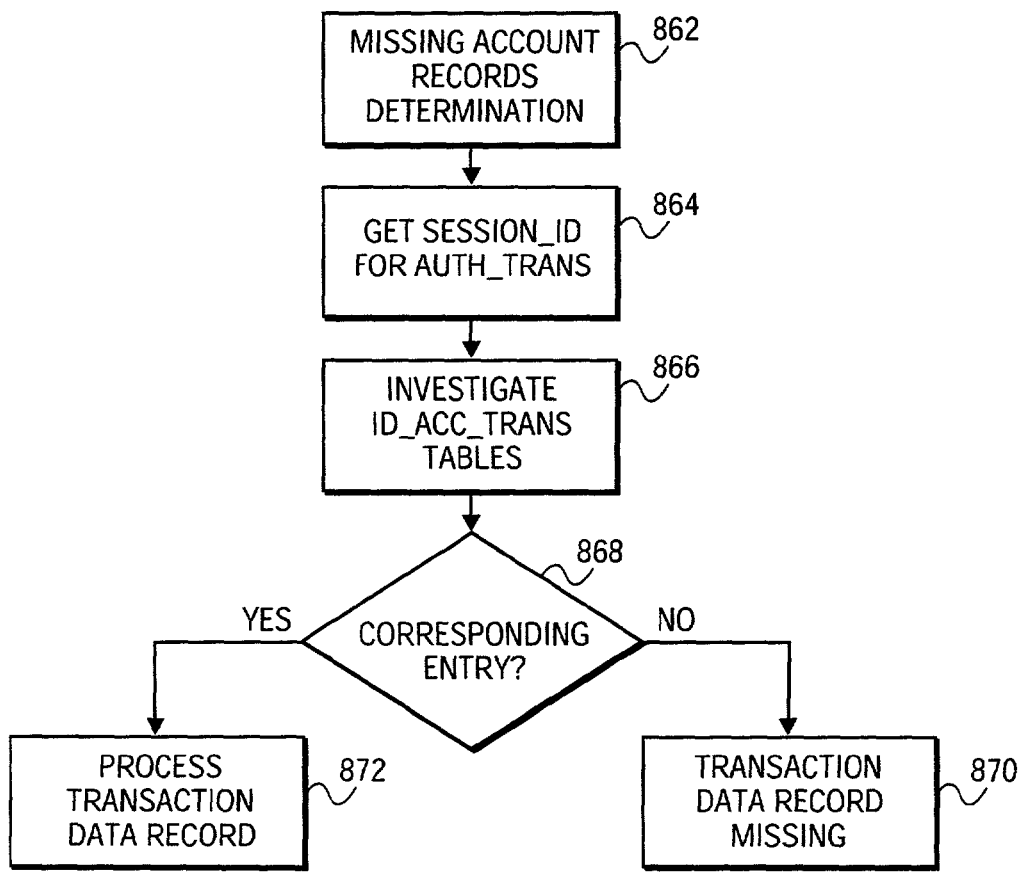
FIG. 19 shows a schematic flow chart of methodology to identify missing transaction data records using a unique session identification.

Missing accounting/transaction data records (see block 862 in FIG. 19) may arise for various reasons such as delivery failure, malformed records, misrouted records, or the like. Delivery failure may occur when the Internet connectivity from the ISPs (e.g., the netserver 470 in FIG. 6) is disrupted, thereby blocking the delivery of the transaction data record to the settlement system 476. A connectivity outage that persists for more than a few minutes typically causes the netserver 476 to discard the transaction data record due to minimal transmission retry capabilities. When using the RADIUS protocol, malformed records are typically discarded at any of several intermediate points including the authentication server of the service provider (e.g., the authentication/authorization server 602 or netserver 470 (see FIG. 6)). Misrouted records are records not sent due to an improper configuration of the ISPs authentication server 602 either accidentally or with fraudulent intent.

As every access session by the user first requires authorization, each session_id field in the authentication transaction tables 856 should include a corresponding session_id field in the acct_trans table. Accordingly, by associating, matching, correlating, investigating, the session_id fields, missing accounting/transaction data records can be determined. In the embodiment depicted in the drawings, missing accounting/transaction data records typically would have an authentication request record in the authentication transaction or auth_trans table 856, but no matching accounting start and/or accounting stop records in the accounting or acct_trans table 854. Thus, by searching for all session_id fields in the acct_trans table that correspond to each session_id field in the auth_trans table, missing accounting/transaction data records may be found (see blocks 864-872).

Inappropriate Accounting Records

Inappropriate accounting/transaction data records may be received by the settlement system 474 (see FIG. 6) usually due to inappropriate configuration of a provider's authentication server (AAA server), e.g. server 600 in FIG. 6. An inappropriate configuration typically causes the provider's authentication server 600 to send all accounting/transaction data records to all proxies instead of just the one responsible for the authentication of the user access session. In these circumstances, no session_id field is present in the auth_trans table of an incorrect recipient. As these accounting/transaction data records typically do not have a corresponding authentication record, they may be identified with relative ease and, for example, a customer support team can resolve the configuration problem with the provider and prevent recurrence of such incorrect transmissions. In these circumstances, the methodology shown in FIG. 19 may be used except that the auth_trans table is searched for a unique session identification corresponding to an entry in the acct_trans table.

Duplicate Accounting Records

Duplicate accounting records are multiple transaction data records that describe the same single user access session. In the embodiment depicted in the drawings, duplicate transaction data records are actively filtered by the settlement system 474 using a relatively simple algorithm that matches six "key" fields of each real-time accounting/transaction data record against all other real-time accounting/transaction data records that have been received within the previous 30 days. The exemplary fields used are: RADIUS Session-Id, Provider ID, NAS IP Address, User, Domain (user auth realm), and Session Time.

In certain embodiments, when all six fields match those in an already-rated record in the CDR table, the current record is marked as a duplicate and discarded.

Duplicate accounting records may arise for a variety of reasons:

Accounting/transaction data records must be acknowledged through the timely transmission of an Accounting-Response message to the sender. Unfortunately "timely" is not defined by the RADIUS specification and different vendors and configurations may resend unacknowledged accounting transactions a few seconds, hours or even days later. When the accounting request was actually received by the settlement system but the acknowledgement was lost or malformed, the originator may resend multiple copies of the accounting record. All such records are captured by the receiving transaction server 468 and eventually retrieved by the settlement system 474 for processing. Peculiar variations on this class may occur which elude the settlement duplicate filtering algorithm wherein the sending NAS 532 sends an updated (e.g., incrementally longer) session time with each retransmission or the RADIUS Session-Id changes between retransmissions. In some cases the NAS 532 does not send a consistent NAS IP address and, in these circumstances, another attribute (e.g., Called Station Id or Provider Id) is used to associate the access session with the service provider or ISP. Such cases reduce the usefulness of the NAS IP for duplicate detection.

Duplicate accounting records may be sent by the "batch" providers whose accounting feeds are assumed to be duplicate-free. Duplicate accounting records may be manually injected into the settlement system 474 when batches of records are sent by real-time accounting providers to complete their accounting responsibility when they have failed to deliver accounting records for one of the reasons described above. In these cases, arbitrary datasets may be sent by the service providers 452, which must be specially processed by personnel at the access broker system 454 to prepare them for submission in a data normalization process. Such datasets may contain data describing both previously reported sessions as well as the missing sessions for which the correction is attempted. Because these record batches are typically pre-processed as one-offs, little control exists to prevent duplicate injection. It will be appreciated that this process can be automated in view of the unique session identification.

Some service providers may admit duplicate transaction data records to the access broker system 454 due to irregular use of key duplicate fields. For example, in certain circumstances, service providers fill the NAS IP attribute with random data that thus adversely influences the duplicate filter criteria. Other anomalies such as inconsistent session id generation or a failure to fix session duration at the time of user disconnect may generate duplicates that appear to correspond to distinct sessions. Once again, the unique session identification can assist in resolving these problems.

As shown by way of example in this document, duplicate accounting/transaction records are actively filtered by the settlement system 474 using an algorithm that matches six "key" fields of each real-time accounting/transaction data record against all other real-time accounting/transaction data records that are received within the previous 30 days. Using the unique session_id field that uniquely identifies each approved single session, enhanced accuracy may be obtained.

Duplicate Alias Records

Duplicate alias records arise when an algorithm to detect duplicates inappropriately identifies a record as duplicate. For example, such cases can arise when a service provider's NAS (for example the NAS 532 of the ISP 510 in FIG. 6) does not generate or reuses session identification data values within a short time. In addition to, or instead of, any session identification generated by the service provider that is not reliable, the unique session identification of the embodiment of the present invention, which uniquely defines each single access session, may be used by the duplicate detection algorithm to reduce the occurrence of duplicate alias records. In particular, the modified unique session identification in the session_id tables may be used to at least substantially reduce duplicate alias records as each session is uniquely identified.

Invalid Session-Length Records

It will be appreciated that all accounting/transaction data records received by the settlement system 474 relating to the duration of an access session may not always be complete. For example, an accounting/transaction data record may have session time duration data (e.g. an Acct-Session-Time attribute) missing, contain a zero value, contain an inaccurate value for the session (e.g., reporting a session as being 4 minutes long when it was in fact 3 minutes long), contain an unreasonably large value or is invalid as defined by RFC 2139, section 5.7 and so on. Invalid access time duration may occur, for example, when a modem bank of a service provider does not report disconnection by the user and the NAS 532 continues to accumulate session time until another session starts on the same physical modem port or a timeout occurs for some other reason.

Accounting/transaction data records with a duplicate invalid session-length can arise for a variety of reasons, for example:

Missing Acct-Session-Time

When an accounting/transaction data record is received by the netserver 470 and is missing the Acct-Session-Time attribute, the netserver 470 typically sends on an accounting/transaction data record with a zero session length.

Inaccurate Acct-Session-Time

Inaccurate time accounting by the NAS 532 or intentional fraud by a service provider can generate accounting/transaction data records with inaccurate session durations.

Acct-Session-Time of Zero

When an accounting/transaction data record with a zero value Session-Time attribute is received by the netserver 470, the netserver 470 typically sends on an accounting/transaction data record with a zero session length.

Large Acct-Session-Time

Due to fraud, malfunction or inappropriate configuration, session time accounting may identify sessions of extravagant duration.

Disconnect Detection Failure

"Long" sessions or multiple sessions with identical duration are sometimes due to malfunction and/or inappropriate configuration of the modem bank of the service provider, which fails to detect user, disconnect for extended periods.

Fraudulent Access

Extended session times may also be due to continuous use by malicious users.

Corrupted Acct-Session-Time

Errors in the field handling by the NAS 532, the authorization/authentication server 600 of the service provider, or the netserver 470 of the service provider may corrupt the session time attribute of an accounting/transaction data record. Based on actual samples, this occurs often when long, vendor-specific data are present in some preceding RADIUS packet.

Genuine Long Sessions

The accuracy of the filtering of long sessions is dependent upon the filter threshold (typically about 100 hours).

Enhanced accuracy may be achieved by correlating, associating or the like the session length provided in the SQM records with session length provided in the accounting records. As each transaction data record has its unique session identification, the session length may be obtained from an associated record using the session_id field of the acct_trans tables and session_id field of the SQM tables 860. Data missing in one transaction data record can thus be obtained from another transaction data record bearing the unique session identification.

Overlapping Accounting Records

In certain circumstances, transaction data records are received from service providers that include the same user credentials (e.g. the same user name and password) that overlap in time. In the present embodiment of the invention, as each access session includes a unique session identification, analysis of overlapping transaction data records may be facilitated. In particular, the session_id field of the acct_trans table 854 and the session_id field of the SQM table 860 may be used for determining the session details of these records. For example, using the unique session identification, it may be determined if such sessions are two genuine different sessions or if the sessions are generated due to a faulty NAS 532.

Disputed Records

As the session identification uniquely identifies each single access session, and data related to the session including the unique session identification is sent to various different servers in the system, dispute resolution may be facilitated. In particular, a customer support team could compare the session details in the authentication or authorized transactions, accounting and SQM tables 856, 854 and 860 respectfully thereby providing three different sources of transaction data uniquely associated with a single user access session. The session_id field of the tables facilitates association, correlation or the like to corroborate details of the particular user access session.

Challenge Provider Records Recording Quality

As each session is uniquely identified, and various different servers communicate transaction data records independently to the settlement system 474, the quality of transaction data records received from a particular service provider may be evaluated by comparing transaction data records from that particular service provider with records from other sources. This may assist a network access team in isolating problems that relate to the accounting function as such or relate to technology problems at the service provider.

Legitimate Id Usage by More Than One Person

As the unique session identification uniquely identifies each single user session, it may be used to identify separate user access occurrences in which legitimate use of a single user identification data is used by more that one user. Thus, 456 customers may share the same login name, e.g. because the organization is small and/or chooses to operate in such a fashion. In such instances, it is possible to see logins from multiple locations with coincidental start times and session lengths being the same. The inclusion of the unique session identification is used to investigate these situations with enhanced accuracy.

Policy Management Versioning of Dialer

The unique session identification can be used to associate, correlate, or the like SQM records with accounting records whereby accounting records created without SQM records can be used to reveal the use of connection application (e.g., the connection application 466) technology, or non-supported versions thereof, that are not associated or provided by the access broker system 454. Typically, a report is created of customers and individual users who are using non-supported versions of the connection application 466 (e.g., connect dialer technology) thereby to help to migrate such users to a more current version. In certain circumstances, when an inappropriate connection application 466 is user by a customer 456, an account associated with the customer may be automatically disabled. Accordingly, the customer 456 may then be forced to contact the access brokerage system 454 to identify the problem and thereby force a version migration.

Overall Billing Process Quality Improvement

It will thus be appreciated that the inclusion of the unique session identification, that uniquely identifies all transaction data records associated with a single user session, enhances the accuracy of transaction record processing. Accordingly, less billing disputes are likely to arise and any dispute resolution that may arise may be settled more expeditiously.

Figure 13:
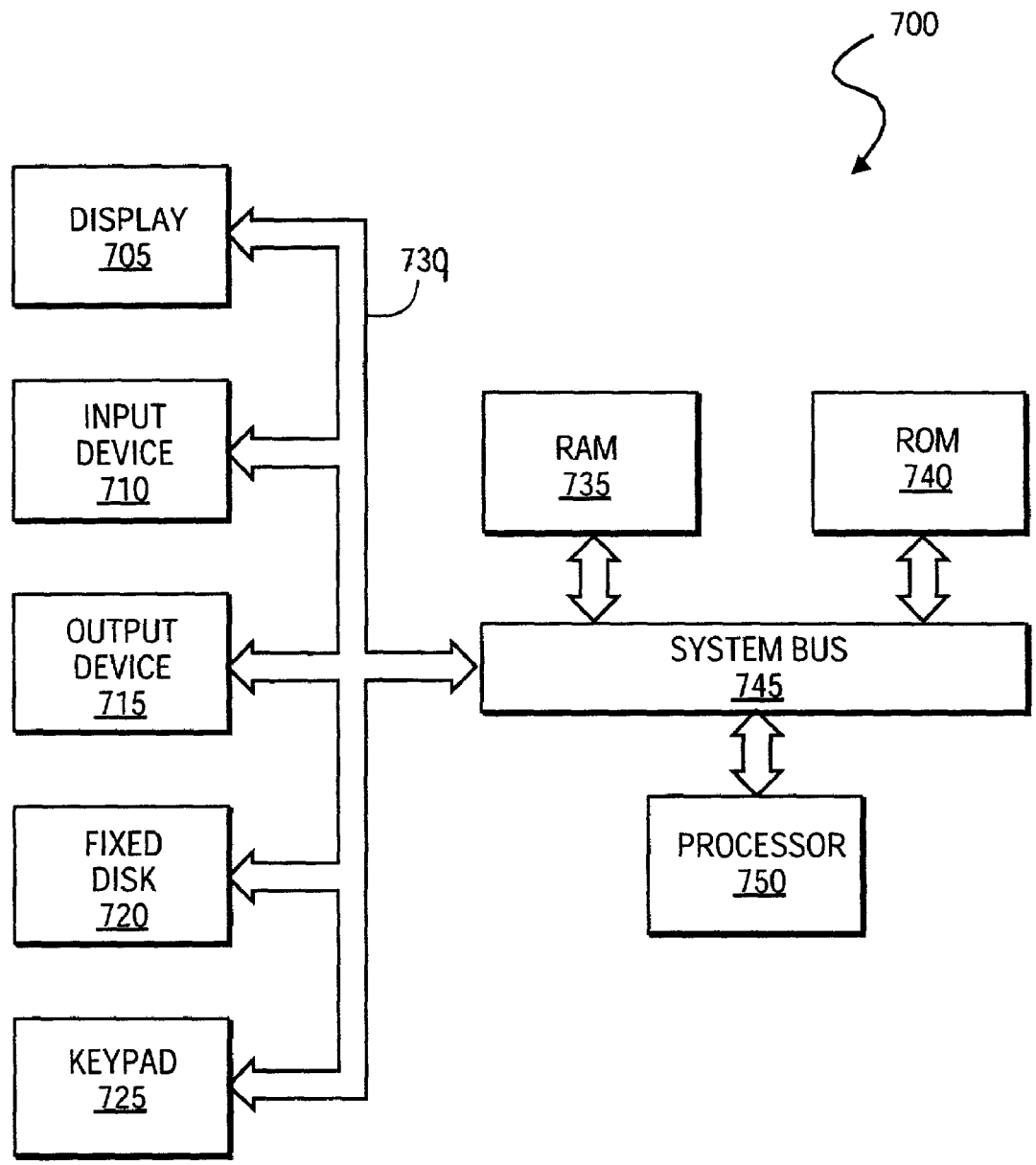
FIG. 13 is a schematic diagram of a computer system, which may be configured as a network access device or a network decryption server.

FIG. 13 is a diagram of a computer system 700, which may be configured as a network access device, such as 205, 305 or 405, a network dialer 466, or a netserver, such as 240, 350, 468, or 472. Computer system 700 includes a processor 750 operatively connected to random access memory (RAM) 735 and read only memory (ROM) 740 via a system bus 745. A processor 750 is also connected to a fixed disk 720, which may be an optical disk or other storage medium, through an input/output bus 730. Alternatively, the processor 750 may be connected to multiple storage devices through the input/output bus 730. The processor 750 communicates data using the system bus 745 and the input/output bus 730.

The system bus 745 and the input/output bus 730 may also receive inputs from a keypad 725 or an input device 710. The system bus 745 and the input/output bus 730 may provide outputs to a display 705, the fixed disk 720, and/or the output device 715. The memory and storage media 735, 740 may also include a flash memory, EEPROM, or any combination of the above.

The computer system 700 may be controlled by operating system software, which includes a file management system, such as, a disk operating system, which is part of the operating system software. The file management system may be stored in non-volatile storage device, such as the ROM 740, and may be configured to cause the processor 750 to execute the various functions required by the operating system to input and output data and to store data in the RAM 735 and on the ROM 740. For one embodiment of exemplary computer system 700, instructions may be stored on the fixed disk 720 or in the ROM 740 that cause the processor 750 to perform the functions of a network access device, such as the network access device 205 or 305. In an alternative embodiment, instructions may be stored on the fixed disk 720 or the ROM 740 that cause the processor 750 to perform the functions of a network decryption server, such as the netservers 240, 350, 472 or 468.

Thus, a method and system for securely authenticating network credentials or user data is described. In the foregoing detailed description, the invention has been described with reference to specific exemplary embodiments thereof. It will, however, be evident that various modifications and changes may be made thereto without departing from the broader scope and spirit of the invention as set forth in the appended claims. The specification and drawings are, accordingly, to be regarded in an illustrative sense rather than a restrictive sense.

What is claimed is:

1. A system for facilitating access to a network-based service offered by a service provider, the system comprising:
    a network connection program configured, to execute in one or more processors, to receive a user credential for use in accessing the network-based service, wherein the user credential was not issued by the service provider;
    convert the user credential into an encrypted credential using an encryption method that requires a private key to decrypt the encrypted credential, and wherein the private key is unknown to the service provider;
    convert the encrypted credential into a plain text credential by application of a character encoding scheme to the encrypted credential, wherein the plain text format is required by one or more standardized network authentication protocols; and
    transmit, via the one or more standardized network authentication protocols, the plain text credential to the service provider;
    a decryption server, having the one or more processors, configured to receive, via the one or more standardized network authentication protocols, the plain text credential from the service provider;
    convert the plain text credential back into the encrypted credential by application of the character encoding scheme;
    convert the encrypted credential back into the user credential based on the private key; and
    transmit, via the one or more standardized network authentication protocols, the user credential for authentication.

2. The system of claim 1, wherein the one or more standardized network authentication protocols include one or more of Password Authentication Protocol, Challenge-Handshake Authentication Protocol, and Remote Authentication Dial In User Service protocol.

3. The system of claim 1, wherein the network connection program is configured to transmit the plain text credential to the service provider via a dial-up connection over a public-switched telephone network.

4. The system of claim 1, wherein the encryption method is an elliptic curve cryptography method.

5. The system of claim 1, wherein the plain text format is US-ASCII.

6. The system of claim 1, wherein the user credential includes a password.

7. A computer-implemented method for electronically facilitating access to a network-based service offered by a service provider, the method comprising:
   receiving, in a decryption server independent of the service provider, a data packet from the network-based service provider, wherein the data packet is formatted according to a first network authentication protocol, wherein the packet includes a user credential that has been converted to text format via a character conversion scheme, wherein the user credential is encrypted such that a private key unknown to the service provider is required for decryption;
   converting the user credential into another format by applying the character conversion scheme;
   decrypting the user credential based on the private key, wherein the decrypting results in the user credential being in the text format;
   forwarding the user credential, via a second network authentication protocol, to an authentication server;
   authenticating, at the authentication server independent of the service provider, the user credential; and
   transmitting, to the service provider, a signal including an indication that the user credential is authentic.

8. The computer-implemented method of claim 7, wherein the first network authentication protocol is one of Password Authentication Protocol and Challenge Handshake Authentication Protocol, and wherein the second authentication protocol is Remote Authentication Dial In User Service protocol.

9. The computer-implemented method of claim 7, wherein the user credential includes a plurality of plain text characters each having a character value, and wherein the character conversion scheme includes operations including determining a modulus value for each character value by calculating the character value modulus 95.

10. The computer-implemented method of claim 7, wherein the user credential includes a plurality of plain text characters each having a character value, and wherein the converting the user credential into another format by applying the character conversion scheme includes:
    calculating, for each character value, the character value modulus 95.

11. The computer-implemented method of claim 7, wherein the text format is the USASCII format.

12. One or more machine-readable storage device including instructions with when executed by a machine cause the machine to perform operations for enabling access to a service offered by a service provider, the operations comprising:
    receiving, at the service provider, a data packet formatted according to a standard network authentication protocol, wherein the data packet includes a access credential in ASCII text format as required by the standard network authentication protocol, wherein the access credential can be decrypted with a private key unknown to the service provider, and wherein the data packet was forwarded by the service provider;
    modifying the access credential by applying a character conversion scheme that transforms characters of the access credential;
    decrypting the network access credential based on the private key and a decryption algorithm associated with the encryption algorithm, wherein the decrypting renders the access credential in the ASCII text format;
    transmitting the access credential for authentication, wherein the access credential is in the ASCII text format as a result of the decrypting.

13. The one or more machine-readable storage device of claim 12, wherein the network authentication protocol is one of Password Authentication Protocol, Challenge-Handshake Authentication Protocol, and Remote Authentication Dial In User Service protocol.

14. The one or more machine-readable storage device of claim 12, wherein the access credential includes a password and customer identifier.

15. The one or more machine-readable storage device of claim 12, wherein the modifying includes determining an ASCII value for each character of the network access credential.

* * * * *